US012580816B2

(12) United States Patent
Griffiths et al.

(10) Patent No.: US 12,580,816 B2
(45) Date of Patent: Mar. 17, 2026

(54) SYSTEMS, METHODS, AND APPARATUSES FOR MITIGATING RESOURCE USAGE

(71) Applicant: Assurant, Inc., New York, NY (US)

(72) Inventors: Rebekah Griffiths, North Tustin, CA (US); Craig Plaice, Ontario (CA); Aery Bai, Atlanta, GA (US); Kevin Shopoff, Dallas, TX (US)

(73) Assignee: Assurant, Inc., New York, NY (US)

( * ) Notice: Subject to any disclaimer, the term of this patent is extended or adjusted under 35 U.S.C. 154(b) by 0 days.

(21) Appl. No.: 18/990,176

(22) Filed: Dec. 20, 2024

(65) Prior Publication Data

US 2025/0211486 A1 Jun. 26, 2025

Related U.S. Application Data

(60) Provisional application No. 63/614,301, filed on Dec. 22, 2023.

(51) Int. Cl.
*H04L 41/0823* (2022.01)
*H04L 41/147* (2022.01)

(52) U.S. Cl.
CPC ........ *H04L 41/0823* (2013.01); *H04L 41/147* (2013.01)

(58) Field of Classification Search
CPC .. G06Q 30/018; G06Q 10/20; G06Q 10/0639; G06Q 10/30; G06Q 50/01; G06Q 50/06; G06Q 10/06315; G06Q 30/08; G06Q 40/04; G06Q 40/08; G06Q 50/08; G06Q 50/26; G06Q 50/40; G06Q 30/06; G06Q 50/04; G06Q 10/00; G06Q 10/04;
(Continued)

(56) References Cited

U.S. PATENT DOCUMENTS 9,483,344 B2 11/2016 Hurst et al.
10,073,754 B2 9/2018 Brewer et al.
(Continued)

OTHER PUBLICATIONS

ISA/220—Notification of Transmittal or Search Report and Written Opinion of the ISA, or the Declaration Mailed on Apr. 1, 2025 for WO Application No. PCT/US24/061550, 16 page(s).
(Continued)

*Primary Examiner* — Djenane M Bayard
(74) *Attorney, Agent, or Firm* — Alston & Bird LLP

(57) ABSTRACT

Various embodiments are directed to apparatuses, methods, computer readable media, computer program products, and systems related to mitigating resource usage. In some embodiments, the system may comprise one or more device management servers and a mobile device. The mobile device may generate at least device triage data. The one or more device management servers may receive a use phase termination indication associated with the mobile device and the device triage data; retrieve a disposition rule set associated with the mobile device; generate, using a model and based on the device triage data, the disposition rule set, or second device triage data, predicted future resource usage data associated with the mobile device; generate, based on the predicted future resource usage data, a resource usage mitigation data object for the mobile device; and cause resource usage mitigation for the mobile device based on the resource usage mitigation data object.

18 Claims, 11 Drawing Sheets

(58) Field of Classification Search

CPC .......... G06Q 10/063; G06Q 10/06375; G06Q 10/06395; G06Q 10/08; G06Q 10/1095; G06Q 2220/00; G06Q 30/0202; G06Q 30/0239; G06Q 30/0605; G06Q 40/10; G06Q 50/02; G06Q 10/1093; G06Q 30/0207; G06Q 30/0208; G06Q 30/0222; G06F 9/505; G06F 2200/1637; G06F 2209/5019; G06F 3/011; G06F 3/017; G06F 3/0346; G06F 3/0482; G06F 3/04842; G06F 3/0488; G06F 16/2462; G06F 16/248; G06F 1/163; G06F 1/1632; G06F 1/1694; G06F 16/9024; G06F 16/9535; G06F 3/045; G06F 3/041; G06F 3/0444

See application file for complete search history.

(56)　　　　　　References Cited

U.S. PATENT DOCUMENTS

| | | | |
|---|---|---|---|
| 10,332,249 B2 | 6/2019 | Dwivedi et al. | |
| 11,531,387 B1 * | 12/2022 | Citron | G06Q 30/0201 |
| 11,580,627 B2 | 2/2023 | Johnson et al. | |
| 2009/0292617 A1 | 11/2009 | Sperling et al. | |
| 2013/0247059 A1 | 9/2013 | Amsterdam et al. | |
| 2021/0081712 A1 | 3/2021 | Saunders et al. | |
| 2022/0358492 A1 * | 11/2022 | Chen | H04L 9/50 |
| 2023/0394496 A1 | 12/2023 | Beer et al. | |
| 2024/0015553 A1 * | 1/2024 | Eleftheriadis | H04W 24/10 |
| 2024/0202742 A1 * | 6/2024 | Krebs | G06Q 30/018 |
| 2024/0273552 A1 * | 8/2024 | Lang | G06Q 50/06 |
| 2024/0289177 A1 | 8/2024 | Schroder et al. | |
| 2024/0289814 A1 | 8/2024 | Schroder et al. | |
| 2025/0014049 A1 * | 1/2025 | Shah | G06V 20/188 |

OTHER PUBLICATIONS

Isley, Steven et al., "Online purchasing creates opportunities to lower the Life cycle carbon footprints of consumer products,", Aug. 15, 2016, Proceedings Fo the National Academy of Sciences (PNAS), 9780-0785, 113, No. 35.

* cited by examiner

400

Predicted Future Resource Usage Data 408

Resource Usage Prediction Server 108A

Mobile Device Resource Usage Model(s) 124

Device Identifier Data 403

Device Triage Data 308

Disposition Rule Set(s) 404

402

500

Predicted Future Resource Usage Data 408

Resource Usage Mitigation Server 112A

Third-Party System(s) 104A-N

Resource Usage Mitigation Data Object 508

Figure 7:
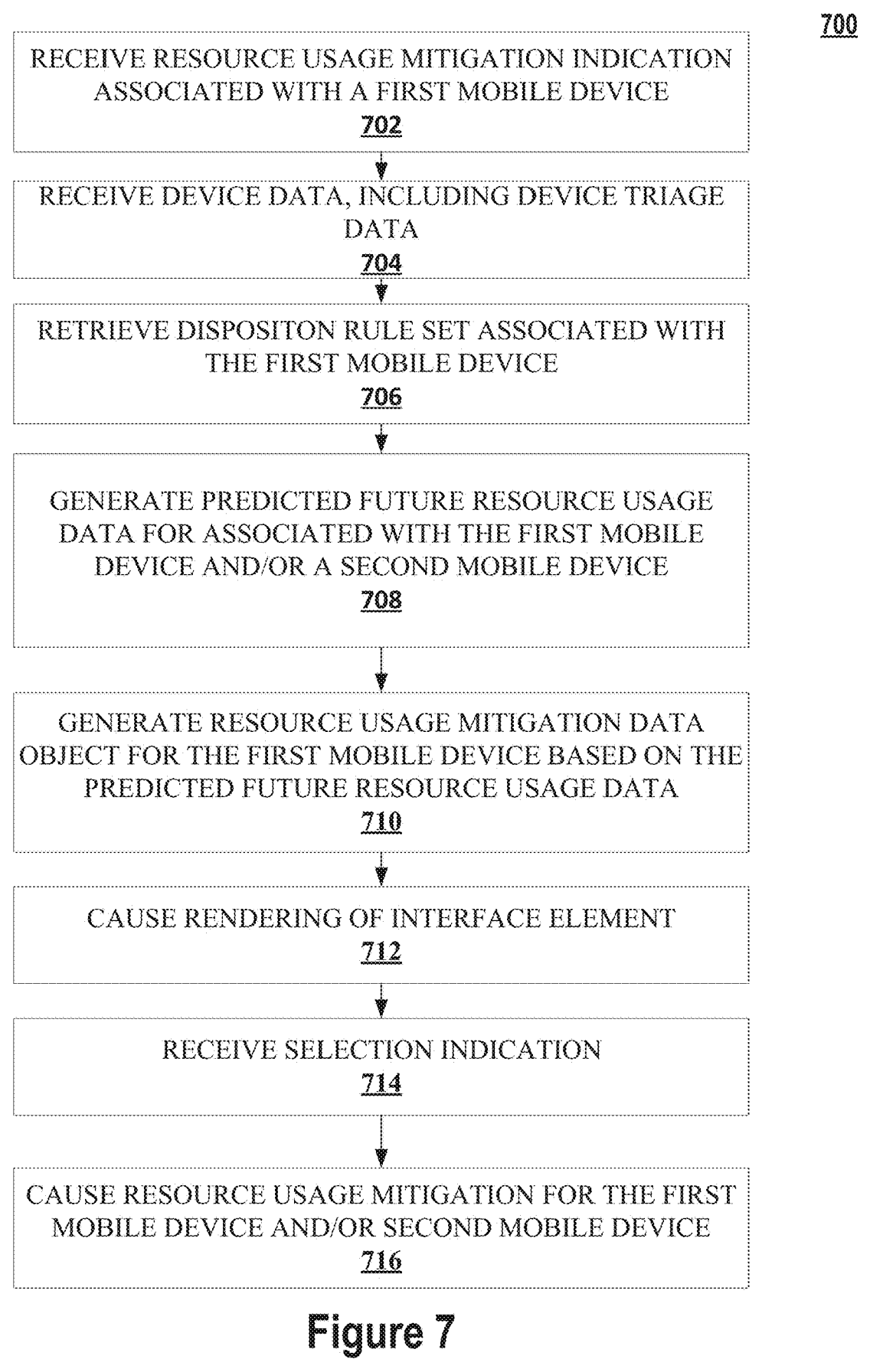

700

RECEIVE RESOURCE USAGE MITIGATION INDICATION
ASSOCIATED WITH A FIRST MOBILE DEVICE
702

RECEIVE DEVICE DATA, INCLUDING DEVICE TRIAGE
DATA
704

RETRIEVE DISPOSITON RULE SET ASSOCIATED WITH
THE FIRST MOBILE DEVICE
706

GENERATE PREDICTED FUTURE RESOURCE USAGE
DATA FOR ASSOCIATED WITH THE FIRST MOBILE
DEVICE AND/OR A SECOND MOBILE DEVICE
708

GENERATE RESOURCE USAGE MITIGATION DATA
OBJECT FOR THE FIRST MOBILE DEVICE BASED ON THE
PREDICTED FUTURE RESOURCE USAGE DATA
710

CAUSE RENDERING OF INTERFACE ELEMENT
712

RECEIVE SELECTION INDICATION
714

CAUSE RESOURCE USAGE MITIGATION FOR THE FIRST
MOBILE DEVICE AND/OR SECOND MOBILE DEVICE
716

Figure 8:
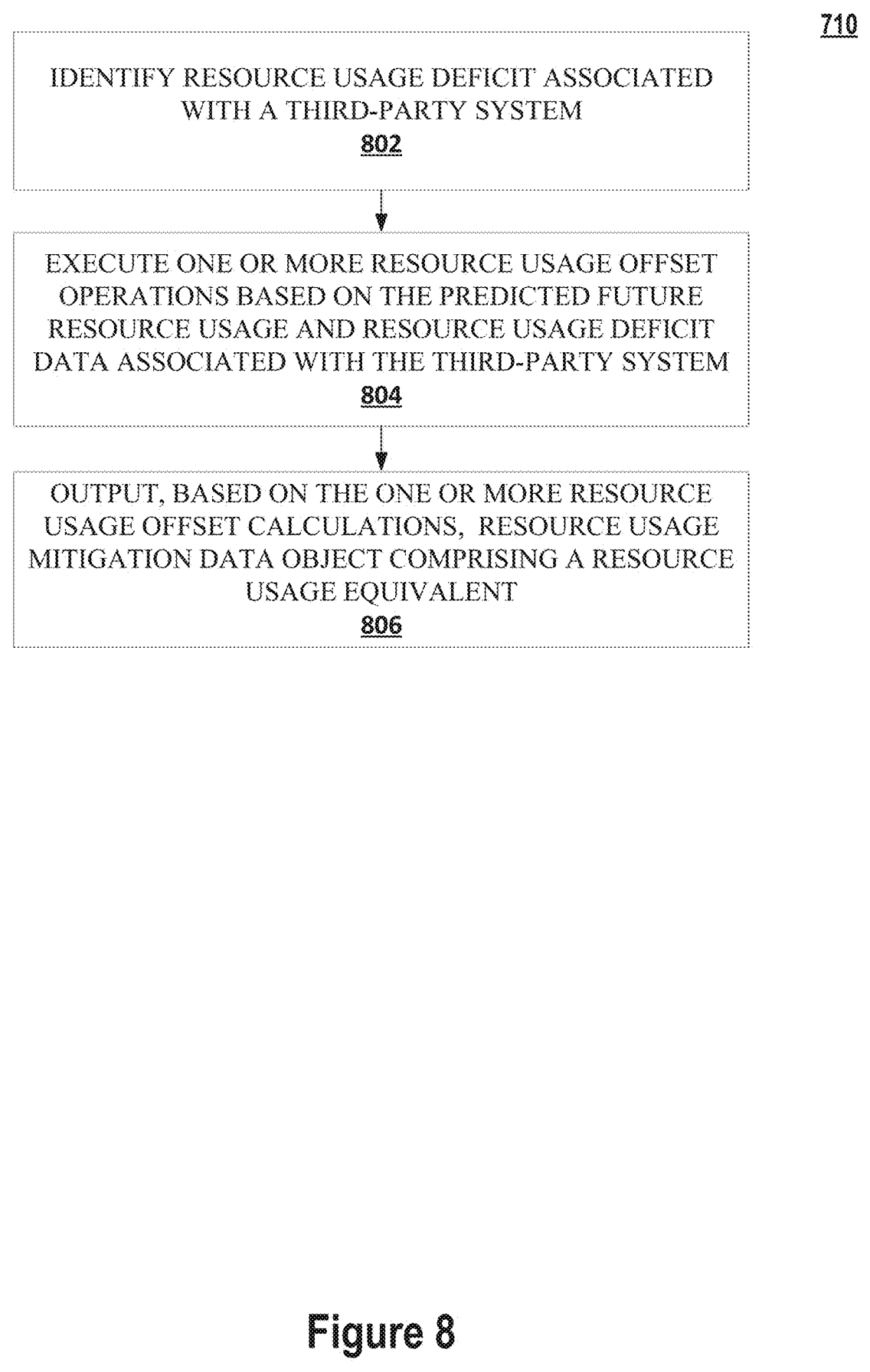

IDENTIFY RESOURCE USAGE DEFICIT ASSOCIATED
WITH A THIRD-PARTY SYSTEM
802

EXECUTE ONE OR MORE RESOURCE USAGE OFFSET
OPERATIONS BASED ON THE PREDICTED FUTURE
RESOURCE USAGE AND RESOURCE USAGE DEFICIT
DATA ASSOCIATED WITH THE THIRD-PARTY SYSTEM
804

OUTPUT, BASED ON THE ONE OR MORE RESOURCE
USAGE OFFSET CALCULATIONS, RESOURCE USAGE
MITIGATION DATA OBJECT COMPRISING A RESOURCE
USAGE EQUIVALENT
806

Promotions

| Promotion Name/Title | Value | Apply |
|---|---|---|
| Carbon Offset | -$5.00 901 | ◉ Remove 902 |

1. Review Quote with customer and verify acceptance of trade. Then follow these steps:

Device Information

| Device | Device Details | Quote Details |
|---|---|---|

Device Details

IME/ESN/MEID/Serial#
351397296259075
Reference#

View Data Wipe Instructions

Galaxy S20 FE 128GB-
Other (SM-G780F)

☐ Remove Device

Quote Details

| Condition | Trade Value |
|---|---|
| ✓ Does the device power on and navigate to the home screen? YES | |
| ✓ Is the Activation Lock turned off? (e.g. Find My iPhone or Reactivation Lock) YES | |
| ✓ Does the LCD function correctly and is the screen free of any dead spots or bruising? YES | |
| ✓ Is the screen free of cracks and undamaged? YES | |
| ✓ Is everything else undamaged, with no cracks and no missing parts (hinge, keypad, housing, buttons, battery door, etc.) YES | |
| Base Price | $120.00 |
| Applied Promotions | |
| ● Carbon Offset | -$5.00 |
| Device Total | $115.00 |

Total Trade Value: $115.00

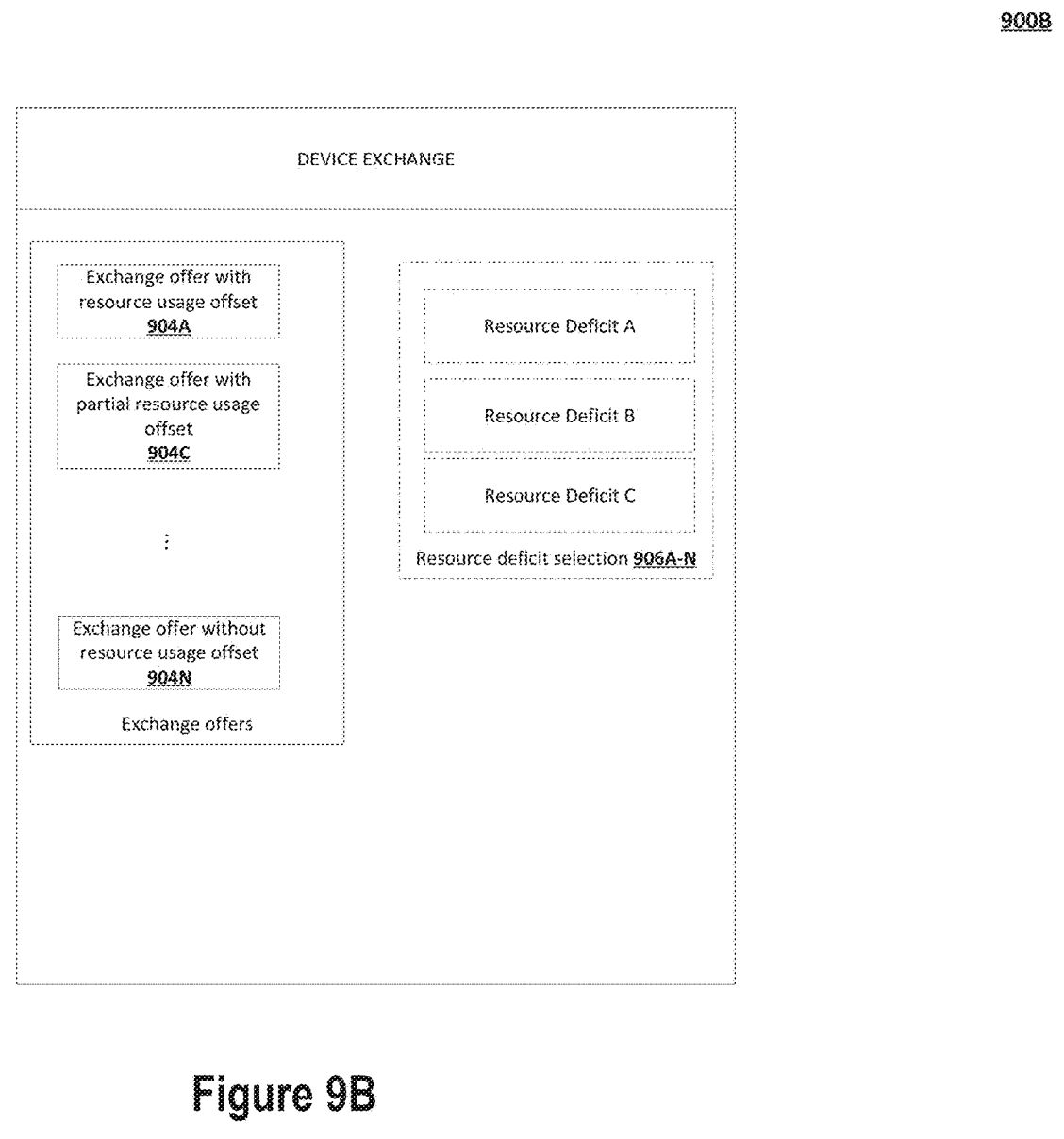

DEVICE EXCHANGE

Resource Deficit A

Resource Deficit B

Resource Deficit C

Resource deficit selection 906A-N

Exchange offer with resource usage offset 904A

Exchange offer with partial resource usage offset 904C

...

Exchange offer without resource usage offset 904N

Exchange offers

Figure 9B

SYSTEMS, METHODS, AND APPARATUSES FOR MITIGATING RESOURCE USAGE

CROSS-REFERENCE TO RELATED APPLICATIONS

This application claims priority to U.S. Provisional Patent Application No. 63/614,301 entitled "SYSTEMS, METHODS, AND APPARATUSES FOR MITIGATING RESOURCE USAGE," filed Dec. 22, 2023, which is incorporated herein by reference in its entirety.

FIELD OF THE INVENTION

The present disclosure relates, generally, to systems, methods, and apparatuses for mitigating resource usage, including, for example, to offsetting resource usage with resource usage deficit. Example embodiments are directed to systems, methods, and apparatuses, for offsetting resource usage associated with a device with resource usage deficit associated with one or more third-party systems.

BACKGROUND

Many environments are resource constrained and such resources may be difficult to dynamically allocate across multiple devices and systems. Applicant has identified a number of deficiencies and problems associated with managing resource usage. Through applied effort, ingenuity, and innovation many deficiencies of existing systems have been solved by developing solutions that are in accordance with the embodiments as discussed herein, many examples of which are described in detail herein.

BRIEF SUMMARY

In general, embodiments of the present disclosure provided herein may relate to mitigating resource usage and various associated systems, apparatus, methods, computer readable media and computer program products. Other implementations for mitigating resource usage will be, or will become, apparent to one with skill in the art upon examination of the following figures and detailed description. It is intended that all such additional implementations be included within this description be within the scope of the disclosure and be protected by the following claims.

Various embodiments are directed to apparatuses, methods, computer readable media, computer program products, and systems related to mitigating resource usage. Various embodiments may include a system comprising: one or more device management servers and a first mobile device, the first mobile device comprising at least one processor and at least one non-transitory memory comprising computer program code, the at least one non-transitory memory and the computer program code configured to, with the at least one processor, cause the first mobile device to: execute one or more diagnostic functions on the first mobile device to generate at least device triage data based on a result of the one or more diagnostic functions; and transmit device data, including the device triage data, directly or indirectly to the one or more device management servers; the one or more device management servers comprising at least one processor and at least one non-transitory memory comprising computer program code, the at least one non-transitory memory and the computer program code configured to, with the at least one processor, cause the one or more device management servers to: receive a use phase termination indication associated with the first mobile device; receive the device data from the first mobile device, wherein the device data comprises device identifier data and the device triage data; retrieve a disposition rule set associated with the first mobile device; generate, using a mobile device resource usage model and based on one or more of (i) the device triage data, (ii) the disposition rule set, or (iii) second device triage data generated by a second apparatus, predicted future resource usage data associated with the first mobile device for a predetermined future time period; generate, based on the predicted future resource usage data, a resource usage mitigation data object for the first mobile device; cause rendering of an interface element to a user associated with the first mobile device, the interface element comprising a visual representation of the resource usage mitigation data object; receive a selection indication associated with the interface element; and transmit computer-executable instructions configured to cause resource usage mitigation for the first mobile device based on the resource usage mitigation data object. In various embodiments, transmitting the computer-executable instructions configured to cause the resource usage mitigation for the first mobile device based on the resource usage mitigation data object comprises transmitting computer-executable instructions configured to offset the predicted future resource usage data with resource usage deficit associated with a third-party system. In various embodiments, generating the resource usage mitigation data object comprises converting the predicted future resource usage data into a predicted token equivalent, and wherein transmitting the computer-executable instructions to offset the predicted future resource usage data with the resource usage deficit associated with the third-party system comprises retrieving the predicted token equivalent. In various embodiments, the disposition rule set comprises subsequent use phase disposition rule set for the first mobile device, wherein generating the predicted future resource usage data associated with the first mobile device comprises determining a use-phase indication associated with the first mobile device based on the device triage data and the subsequent use phase disposition rule set for the first mobile device. In various embodiments, the one or more device management servers is configured to transmit computer-executable instructions to cause the first mobile device to execute the one or more diagnostic functions on the first mobile device to generate the device triage data.

Various embodiment may include one or more device management servers comprising at least one processor and at least one non-transitory memory comprising computer program code, the at least one non-transitory memory and the computer program code configured to, with the at least one processor, cause the one or more device management servers to: receive a use phase termination indication associated with a first mobile device; receive device data associated with the first mobile device, wherein the device data comprises device identifier data and device triage data; retrieve a disposition rule set associated with the first mobile device; generate, using a mobile device resource usage model and based on one or more of (i) the device triage data, (ii) the disposition rule set, or (iii) or second device triage data generated by a second apparatus, predicted future resource usage data associated with the first mobile device for a predetermined future time period; generate, based on the predicted future resource usage data, a resource usage mitigation data object for the first mobile device; cause rendering of an interface element to a user associated with the first mobile device, the interface element comprising a visual representation of the resource usage mitigation data object; receive a selection indication associated with the interface element; and transmit computer-executable instructions configured to cause resource usage mitigation for the first mobile device based on the resource usage mitigation data object. In various embodiments, transmitting the computer-executable instructions configured to cause the resource usage mitigation for the first mobile device comprises transmitting computer-executable instructions to offset the predicted future resource usage data with resource usage deficit associated with a third-party system. In various embodiments, generating the resource usage mitigation data object comprises converting the predicted future resource usage data into a predicted token equivalent, and wherein transmitting the computer-executable instructions to offset the predicted future resource usage data with the resource usage deficit associated with the third-party system comprises acquiring the predicted token equivalent. In various embodiments, the disposition rule set comprises subsequent use phase disposition rule set for the first mobile device, wherein generating the predicted future resource usage data associated with the first mobile device comprises determining a use-phase indication associated with the first mobile device based on the device triage data and the subsequent use phase disposition rule set for the first mobile device. In various embodiments, the use-phase indication is configured to trigger a second use phase associated with the first mobile device. In various embodiments, the predicted future resource usage data comprises one or more of (i) predicted subsequent use phase resource usage data associated with the first mobile device or (ii) predicted first use phase resource usage data associated with a second mobile device. In various embodiments, the at least one non-transitory memory and the computer program code are configured to, with the at least one processor, to further cause the one or more device management servers to: diagnose a defect associated with the first mobile device based on the device triage data; programmatically determine a solution from a plurality of solutions for resolving the defect, determine, by the mobile device resource usage model, predicted resource usage data associated with the solution, and adjust the predicted future resource usage data based on the predicted resource usage data associated with the solution. In various embodiments, the device triage data comprises one or more of defect data, operational status data, or device image data. In various embodiments, the at least one non-transitory memory and the computer program code are configured to, with the at least one processor, further cause the one or more device management servers to transmit computer-executable instructions to cause the second apparatus comprising at least one camera to capture one or more images of the first mobile device, wherein the mobile device resource usage model is configured to generate the predicted future resource usage data based on at least the one or more images. In various embodiments, generating the predicted future resource usage data comprises: processing the one or more images to generate a utility measure for the first mobile device based at least in part on a condition of a screen of the first mobile device; and responsive to triggering a replacement of the screen, generating predicted resource usage data associated with the replacement of the screen, wherein the predicted future resource usage data for the first mobile device comprises a second predicted resource usage data associated with the replacement of the screen. In various embodiments, transmitting computer-executable instructions configured to cause resource usage mitigation for the first mobile device comprises transmitting computer-executable instructions to cause the first mobile device and a second mobile device to be associated with different user accounts. In various embodiments, the predetermined future time period comprises a time period from receiving the use phase termination indication to a predicted device lifecycle end phase, wherein the predicted future resource usage data is generated for a plurality of device lifecycle phases associated with the time period from receiving the use phase termination indication to the predicted device lifecycle end phase. In various embodiments, the at least one non-transitory memory and the computer program code are configured to, with the at least one processor, further cause the one or more device management servers to: generate aggregated predicted future resource usage data associated with a plurality of mobile devices over a previous time period; generate, using one or more machine learning models and based on the aggregated predicted future resource usage data, predicted resource usage associated with a future time period; transmit computer-executable instructions configured to cause resource usage deficit assignment from one or more third-party systems corresponding to the predicted resource usage associated with the future time period.

Various embodiments may include a computer implemented method comprising: receiving, by one or more processors, a use phase termination indication associated with a first mobile device; receiving, by the one or more processors, device data associated with the first mobile device, wherein the device data comprises device identifier data and device triage data; retrieving, by the one or more processors, a disposition rule set associated with the first mobile device; generating, by the one or more processors, using a mobile device resource usage model and based on one or more of (i) the device triage data, (ii) the disposition rule set, or (iii) second device triage data generated by a second apparatus, predicted future resource usage data associated with the first mobile device for a predetermined future time period; generating, by the one or more processors, based on the predicted future resource usage data, a resource usage mitigation data object for the first mobile device; causing, by the one or more processors, rendering of an interface element to a user associated with the first mobile device, the interface element comprising a visual representation of the resource usage mitigation data object; receiving, by the one or more processors, a selection indication associated with the interface element; and transmitting, by the one or more processors, computer-executable instructions configured to cause resource usage mitigation for the first mobile device based on the resource usage mitigation data object. In various embodiments, transmitting the computer-executable instructions configured to cause the resource usage mitigation for the first mobile device comprises transmitting computer-executable instructions to offset the predicted future resource usage data with resource usage deficit associated with a third-party system. In various embodiments, generating the resource usage mitigation data object comprises converting the predicted future resource usage data into a predicted token equivalent, and wherein transmitting the computer-executable instructions to offset the predicted future resource usage data with the resource usage deficit associated with the third-party system comprises acquiring the predicted token equivalent. In various embodiments, the disposition rule set comprises subsequent use phase disposition rule set for the first mobile device, wherein generating the predicted future resource usage data associated with the first mobile device comprises determining a use-phase indication associated with the first mobile device based on the device triage data and the subsequent use phase disposition rule set for the first mobile device. In various embodiments, the use-phase indication is configured to trigger a second use phase associated with the first mobile device. In various embodiments, the predicted future resource usage data comprises one or more of (i) predicted subsequent use phase resource usage data associated with the first mobile device or (ii) predicted first use phase resource usage data associated with a second mobile device. In various embodiments, the method further comprises diagnosing a defect associated with the first mobile device based on the device triage data; programmatically determining a solution from a plurality of solutions for resolving the defect, determining, by the mobile device resource usage model, predicted resource usage data associated with the solution, adjusting the predicted future resource usage data based on the predicted resource usage data associated with the solution. In various embodiments, the device triage data comprises one or more of defect data, operational status data, or device image data. In various embodiments, the method further comprises transmitting computer-executable instructions to cause the second apparatus comprising at least one camera to capture one or more images of the first mobile device, wherein the mobile device resource usage model is configured to generate the predicted future resource usage data based on at least the one or more images. In various embodiments, generating the predicted future resource usage data comprises: processing the second device triage data to generate a utility measure for the first mobile device based at least in part on a condition of a screen of the first mobile device; and responsive to triggering a replacement of the screen, generating predicted resource usage data associated with the replacement of the screen, wherein the predicted future resource usage data for the first mobile device comprises a second predicted resource usage data associated with the replacement of the screen. In various embodiments, transmitting computer-executable instructions configured to cause resource usage mitigation for the first mobile device comprises transmitting computer-executable instructions to cause the first mobile device and a second mobile device to be associated with different user accounts. In various embodiments, the predetermined future time period comprises a time period from receiving the use phase termination indication to a predicted device lifecycle end phase, wherein the predicted future resource usage data is generated for a plurality of device lifecycle phases associated with the time period from receiving the use phase termination indication to the predicted device lifecycle end phase.

BRIEF DESCRIPTION OF THE DRAWINGS

Reference will now be made to the accompanying drawings, which are not necessarily drawn to scale, and wherein:

FIG. 7 illustrates an example flowchart depicting operations for mitigating resource usage in accordance with at least some embodiments of the present disclosure;

FIG. 8 illustrates an example flowchart depicting operations for generating resource usage mitigation data object in accordance with at least some embodiments of the present disclosure; and FIGS. 9A-B illustrate example graphical user interfaces depicting resource usage mitigation data object in accordance with at least some embodiments of the present disclosure.

DETAILED DESCRIPTION

Figure 1:
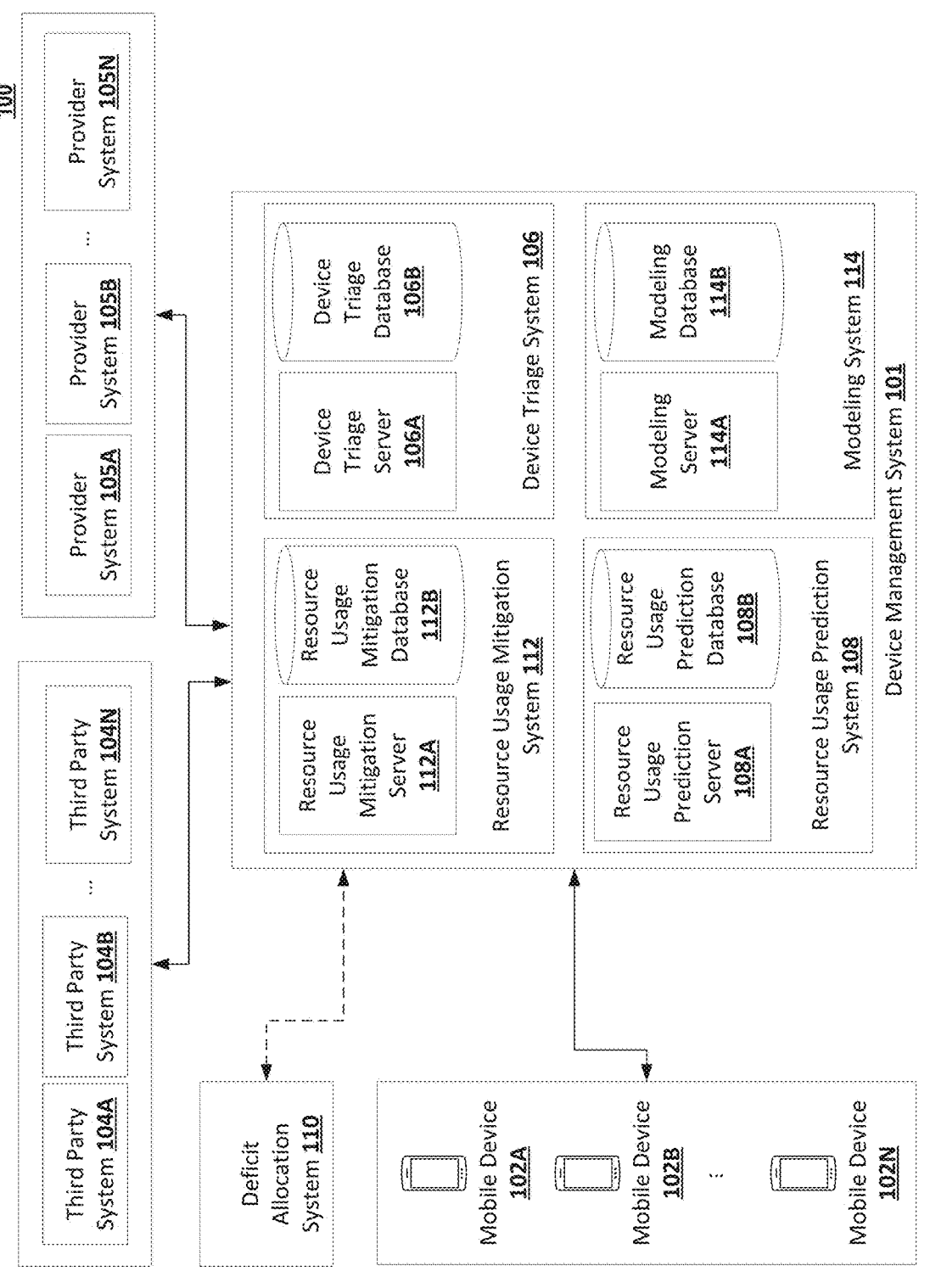
FIG. 1 illustrates an example system environment within which at least some embodiments of the present disclosure may operate.

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

It should be understood at the outset that although illustrative implementations of one or more aspects are illustrated below, the disclosed assemblies, systems, and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents. While values for dimensions of various elements are disclosed, the drawings may not be to scale.

The words "example," or "exemplary," when used herein, are intended to mean "serving as an example, instance, or illustration." Any implementation described herein as an "example" or "exemplary embodiment" is not necessarily preferred or advantageous over other implementations.

Embodiments of the present disclosure now will be described more fully hereinafter with reference to the accompanying drawings, in which some, but not all embodiments of the disclosure are shown. Indeed, embodiments of the disclosure may be embodied in many different forms and should not be construed as limited to the embodiments set forth herein; rather, these embodiments are provided so that this disclosure will satisfy applicable legal requirements. Like numbers refer to like elements throughout.

Overview

Device operation (e.g., mobile device operation) and device-related functions and processes require resources to effect, including device lifecycle processes, such as first and subsequent use phases and use phase transitions. Device resource usage cannot be adequately tracked and mitigated by current systems. Provided herein are various systems, methods, apparatuses, and other features related to device resource usage mitigation, including but not limited to triaging a mobile device, calculating future resource usage based on device triage data, identifying resource usage deficit for offsetting predicted future resource usage, and/or causing resource usage mitigation for one or more devices.

Embodiments of the systems, apparatuses, and methods discussed herein may include, but are not limited to, directing, controlling, effecting, and/or otherwise facilitating device triage and/or the implementation of one or more solutions, including prediction of the resource usage associated with such solutions. Such processes may additionally or alternatively include, but are not limited to, directing, controlling, effecting, and/or otherwise facilitating device disposition, which may include one or more second use phases, final disposition, or the like.

Embodiments of the systems, apparatuses, and methods discussed herein may use the device triage data to predict future resource usage associated with one or more mobile devices. Example embodiments may leverage one or more models to predict future resource usage. Such predicted future resource usage data may comprise predicted future resource usage associated with a mobile device (e.g., a first mobile device, second mobile device, etc. as described in various embodiments herein). For example, example embodiments may generate predicted future resource usage data that includes one or more of predicted resource usage data associated with a second use phase of a first mobile device or predicted resource usage data associated with a first use phase of a second mobile device. Some embodiments may generate predicted future resource usage data for a mobile device using device data that may or may not include device triage data. For example, some embodiments, may generate predicted future resource usage for certain mobile devices based on device identifier data alone or device identifier data and other data.

Embodiments of the systems, apparatuses, and methods discussed herein may use the predicted future resource usage data determinations to control and direct one or more downstream processes, which may mitigate resource usage associated with a mobile device or group of mobile devices. Such processes may include, but are not limited to, directing, controlling, effecting, and/or otherwise facilitating sourcing, managing, and/or acquiring resource usage deficit associated with a third-party system to offset predicted resource usage associated with one or more mobile devices. Embodiments of the systems, apparatuses, and methods discussed herein may be configured to trigger computer-executable instructions configured to use the resource usage deficit associated with the third-party system to offset the predicted future resource usage of associated with one or more mobile devices to improve the resource usage efficiency score of the respective mobile devices via resource usage mitigation.

Various technical improvements will be appreciated from the present disclosure. In some embodiments, non-limiting examples of such technical improvements facilitated by one or more embodiments discussed herein include improved functioning of a device (e.g., mobile devices or other devices discussed herein). In some embodiments, non-limiting examples of such technical improvements facilitated by one or more embodiments discussed herein include mitigating resource usage which may facilitate net resource savings (e.g., materials, energy, bandwidth, and/or carbon efficiency). For example, embodiments of the present disclosure may ensure efficient allocation of resources across systems and/or devices and may cause one or more systems and/or devices to operate at a neutral resource usage, a negative net resource usage, and/or less than or equal to an acceptable resource usage level for at least one or more predetermined time periods.

In some embodiments, non-limiting examples of such technical improvements facilitated by one or more embodiments discusses herein include improving resource usage (e.g., reducing net resource usage) of one or more mobile devices such that a net resource of a the one or more mobile devices is optimized, which in turn improves resource allocation and efficiency.

Some further examples of technical improvements include improved technical support via programmatic diagnosis and individualized recommendations. One or more of the various functions herein, including resource usage mitigation may be performed in real time or near real time (e.g., by pre-identifying and/or acquiring resource usage deficit for rapid application to a mobile device). In some embodiments, resource usage deficits or token equivalents thereof may be identified and aggregated asynchronously with resource usage mitigation associated with a mobile device, which may facilitate real-time or near real-time mitigation from a repository of aggregated resource usage deficits or token equivalents thereof. Separate processes of aggregation and mitigation may thereby be run in parallel to reduce the net processing and communication load at the time of request.

Definitions

In some embodiments, some of the operations above may be modified or further amplified. Furthermore, in some embodiments, additional optional operations may be included. Modifications, amplifications, or additions to the operations above may be performed in any order and in any combination.

As used herein, the terms "data," "content," "information," and similar terms may be used interchangeably to refer to data capable of being transmitted, received, and/or stored in accordance with embodiments of the present disclosure. Thus, use of any such terms should not be taken to limit the spirit and scope of embodiments of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

As used herein, the term "circuitry" refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. In some embodiments, "circuitry" may include processing circuitry, storage media, network interfaces, input/output devices, and/or the like. As a further example, as used herein, the term "circuitry" also includes an implementation comprising one or more processors and/or portion(s) thereof and accompanying software and/or firmware. As another example, the term "circuitry" as used herein also includes, for example, a baseband integrated circuit or applications processor integrated circuit for a mobile phone or a similar integrated circuit in a server, a cellular network device, other network device, and/or other computing device.

As used herein, a "computer-readable storage medium," refers to a physical storage medium (e.g., volatile, or non-volatile memory device), and may be differentiated from a "computer-readable transmission medium," which refers to an electromagnetic signal.

As used herein, the terms "data structure", "data object", or "data set" refer interchangeably to a collection of data capable of being collectively transmitted, received, and/or stored.

As used herein, "user device", and "device" refer to computer hardware and/or software configured to be associated with a user profile and used for one or more portions of a device lifecycle. As used herein, the term "device lifecycle" refers to one or more stages of the life of a device, optionally including, but not limited to, any one or more of sourcing of raw material; manufacture of the device, including one or more components thereof; one or more use phases (also referred to a use periods) of the device by one or more users; one or more device triage periods of the device (e.g., preparing a device for a subsequent use phase or final disposition); and/or final disposition of the device (e.g., recycling). As used herein, "mobile device" may refer to a device that is capable of being held and transported by a user. Example devices include but not limited to, smart phones, tablet computers, laptop computers, wearables, laptop computers, and/or the like. In some examples, a device may be associated with a device identifier. In some examples, a device may be associated with a sequence of one or more use phases.

As used herein, the term "device identifier" refers to one or more items of data by which a device or a group of devices may be identified or distinguished from one or more other devices (e.g., make, model, carrier, location, memory size, color, serial number, IMEI, MAC address, etc.). A device identifier, for example, may comprise any number of data items that identifies a subset of devices from a population of devices. In some examples, a device identifier may comprise input data configured to be applied to a model. In some embodiments, a device identifier may comprise ASCII text, a pointer, a memory address, and/or other data that uniquely identifies a particular device or group of devices.

As used herein, the term "device data" refers to a data entity associated with a device, including data generated by a device and data generated about a device. Device data may include one or more device data segments. As used herein, the term "device data segment" refers to device data associated with a device or a portion thereof, including a device lifecycle or portion thereof. Non-limiting examples of device data segments include "device processing data" (e.g., device allocation and registration, device shipping type, packaging materials, device manufacturing method, and/or the like); "device characteristic data" (e.g., device type, device model, device location, device geographic region of service, and/or the like), which may include "component data" (e.g., device battery type, device screen type, device processor type, and/or the like); "direct consumption data" (e.g., actual and/or predicted energy consumption of the device); and/or "channel data" (e.g., a pathway from which a device may be received or into which a device may be transmitted for disposition and/or various data associated therewith). Device data segments may be or may include resource usage data associated with a device or device lifecycle, including portions thereof. In some examples, device data and/or one or more segments of device data may be leveraged to generate predicted future resource usage data associated with a device. In some examples, device data may include device triage data and/or device identifier data. As used herein, the term "device triage data" refers to data about a device that may be leveraged to assess the device, including, for example, diagnosing defect(s) that may be associated with the device. Device triage data may include performance data, system data, defect data, cosmetic data, usage data, activity data, and/or other data associated with a device that may be leveraged to assess the device. For example, device triage data may comprise a grade of a device, an identification of a defect associated with the device, or any other indicator. In some examples, at least a portion of device triage data for a device may be generated by performing one or more diagnostic functions with respect to the device. In some examples a portion of device triage data may be outputted by the respective device. Alternatively or additionally, in some examples, a portion of device triage data may be outputted by an external computing system configured to perform one or more diagnostic functions on the respective device.

As used herein, the term "use phase" refers to a data entity that describes a time interval in which a device is associated with a user. For example, a use phase may comprise a period in which a device is linked to a user account. In some examples, a use phase may represent a lifecycle stage of a plurality of lifecycle stages of a device. Additionally or alternatively, in some examples, a use phase may be associated with one or more lifecycle stages of a device. In some examples, each use phase of a sequence of use phases for a device may be associated with device data associated with one or more device data of the device. For example, a first use phase and a second use phase may be associated with different device data.

As used herein, the term "defect" refers to any actual and/or perceived imperfection, fault, abnormality, and/or similar terms, that impairs the quality, function, utility, and/or appearance of device, including a grade or other metric associated with such defects. For example, a defect may comprise any feature that makes a device less than "like-new" quality, including mechanical defects (e.g., stuck camera lens, electrical defects (e.g., faulty hardware and/or hardware performing substandard, such as a reduced battery capacity, faulty or broken touch screen, non-functioning camera, or the like), software defects (e.g., operating system errors, application crashes, lagging, etc.), cosmetic imperfections or damage (e.g., broken glass, cracks, scratches, chips, or the like), and/or the like. In some examples, a defect may be associated with one or more components of a device, including hardware components and non-hardware components. In some examples, defects may be classified via diagnostic algorithms into one or more categories, or otherwise classified by type. Non-limiting examples of defect categories include cosmetic or performance related defects (e.g., whether the defect affects the operation of the device); repairable or not repairable defects; remotely repairable (e.g., defects whose solutions may include remote software fixes, shipped parts directly to customers, or the like) or non-remotely repairable defects; critical or non-critical defects (e.g., defects affecting the ability of the device to enter a subsequent use cycle). In some examples, a particular defect may be resolved with one or more solutions.

As used herein, the term "solution" refers to a data entity that describes a potential resolution for one or more defects associated with a device. Non-limiting examples of solutions include remote resolution (e.g., remotely repaired via software update), onsite resolution (e.g., physical or electronic resolution at a device support location), a combination thereof, and/or the like. Non-limiting examples of solutions include application or application update installation, repair, replacement, refurbishment, a combination thereof, and/or the like. In some examples, a solution may include a disposition of the device (e.g., channel selection, such as sale or recycling) and/or no modification to the device, such as in the event that the defect cannot be repaired or is not worth repairing. In some examples, a solution may include a channel selection, such as programmatically matching a solution and a state of the device following the solution with the quality of device accepted by one or more channels (e.g., "like-new" devices may be resold in a retail location, "functioning, good condition" devices may be directed to a wholesaler, etc.). Solutions may include computer-executable instructions configured to cause one or more assemblies to direct the device to a particular location (e.g., configuring a sorting machine, such as a robotic arm or a sortation conveyor). In some examples, a particular solution of a plurality of solutions may be selected and performed (e.g., automatically) to resolve a defect. Additionally or alternatively, in some examples, a solution may be selected based on user input and performed (e.g., automatically) in response to the selection. In some examples, each solution of a plurality of solutions that may be employed to resolve a defect may be associated with one or more device lifecycle stages. Additionally or alternatively, in some examples, each solution of a plurality of solutions that may be employed to resolve a defect may be associated with resource usage data for the solution.

As used herein, the term "model" refers to a data entity that describes parameters, hyper-parameters, and/or defined operations of a rules-based algorithm, machine learning model (e.g., model including at least one or more rule-based layers, one or more layers that depend on trained parameters, coefficients, and/or the like), and/or the like. A model may include one or more of any type of machine learning model including one or more supervised, unsupervised, semi-supervised, reinforcement learning models, and/or the like. In some examples, a model may include multiple models configured to perform one or more different stages of a prediction task. As used herein, the term "mobile device resource usage model" refers to a model configured, trained, and/or the like to generate predicted future resource usage data associated with one or more mobile devices. In some examples, the mobile device resource usage model is trained, configured, and/or the like to generate predicted future resource usage data associated with at least one mobile device for a predetermined future time period based on device triage data and/or preference data associated with the mobile device.

As used herein, the term "predicted future resource usage data" refers to data indicative of resource usage, resource requirements, and/or resource cost incurred or expected to be incurred (e.g., during a predetermined time period), including but not limited to resource usage, resource requirements, and/or resource cost associated with one or more devices, device data segments, solutions, lifecycle stages, or the like. Predicted future resource usage data may comprise predicted resource usage, resource requirements, and/or resource cost associated with one or more elements of a device, including for example, resource usage, resource requirements, and/or resource cost data associated with material processing, manufacturing, transportation/shipping, end of life activities (e.g., recycling), usage (e.g., electrical or other consumable resources), and/or the like.

Resource usage, resource requirements, and/or resource cost may include direct and indirect usage, requirements, or costs (inclusive of Scope 3 usage, requirements, or costs), which usage, requirements, or costs may include net inputs and/or outputs associated with a device (e.g., energy fed into a device, whether directly or indirectly, for operation and/or emissions produced by a device, whether directly or indirectly). Non-limiting examples of predicted future resource usage data include processor usage; bandwidth; other computational resources; storage space; actual and/or predicted energy requirements/cost for one or more device lifecycle stages, predicted greenhouse gas emissions (e.g., lbs. carbon dioxide for one or more device life cycle stages, actual and/or predicted material requirements/cost for one or more device life cycle stages, and/or the like). Other examples are provided herein. In some examples, predicted future resource usage data may include a resource consumption structure associated with a device such as, for example, energy consumption structure associated with a particular device element type, greenhouse gas emission structure associated with a particular device element type, and/or the like. In some examples, predicted future resource usage data may reflect predicted ecological footprint associated with one or more device lifecycle stages such as, for example, carbon footprint. In some examples, predicted future resource usage data may be retrieved from various data sources, including for example, third-party data sources. In some embodiments, predicted future resource usage data may be based on historical resource usage. In some embodiments, predicted future resource usage data may be based on measured resource usage or measured indicia of resource usage (e.g., processor energy consumption, battery usage, etc.). Additionally or alternatively, in some examples, predicted future resource usage data may be derived from data retrieved from various data sources. In some examples, predicted future resource usage data may comprise aggregated data associated with a plurality of devices. In some examples, predicted future resource usage may be leveraged to generate resource usage mitigation data object associated with a mobile device.

As used herein, the term "resource usage mitigation data object" refers to an electronically managed structured arrangement of data configured to facilitate resource usage mitigation (also referred to as resource usage offset). In some examples, a resource usage mitigation data object may be generated (e.g., by a device management system) based on predicted resource usage data associated with one or more mobile devices and/or data associated with one or more third-party systems. Such data associated with a third-party system may include, but is not limited to, resource usage deficit data associated with the third-party system such as resource usage deficit type, resource usage deficit exchange rate, resource usage deficit quantity, and/or other data that may be leveraged to determine a resource usage equivalent for predicted future resource usage associated with one or more mobile devices. In some examples, a resource usage mitigation data object comprises a corresponding representation of a resource usage deficit, token equivalent, or other similar that can be leveraged to offset the predicted future resource usage. In one non-limiting example, the resource usage mitigation data object comprises a token equivalent or other resource usage deficit equivalent. In some examples generating the resource usage mitigation data object comprises converting the predicted future resource usage data into a predicted token equivalent.

As used herein, a "resource usage equivalent" or "token equivalent" refers to a data construct that describes a digital or physical asset that can be exchanged for, represent, or be leveraged to acquire resource usage deficit associated with a third-party system. A token equivalent may be configured to standardize and normalize the resource usage deficits for transferability across computing systems. By way of non-limiting example, the token equivalent may correspond to transferrable carbon offset credits, currency, coupons, credits, or other data construct usable for offsetting resource usage associated with one or more systems or devices. As used herein, the term "resource usage deficit" refers to a data construct that describes third-party resource configured to offset or otherwise compensate for resources consumed or predicted to be consumed by a computing system, such as a mobile device. A resource usage deficit may be allocated to or otherwise used to generate a token equivalent or other resource usage equivalent for exchange to offset a resource usage. Non-limiting examples of such resource usage deficit include unused carbon or other greenhouse gas, resource capture (e.g., carbon capture), or other sources of a token equivalent. In some embodiments, resource usage deficits may comprise a flag identifying a source, type, location of origin, or other classifier associated with the resource usage deficit. As used herein, the term "resource usage mitigation" refers to a specialized hardware, firmware, and/or software level process for offsetting predicted resource usage associated with one or more computing systems with resource usage deficit associated with one or more other computing systems. For example, a resource usage mitigation process may include resource usage deficit assignment from a third-party system to offset predicted resource usage associated with a mobile device. For example, a device management system may acquire data representing resource usage deficits to offset the predicted resource usage (e.g., token equivalent corresponding to the predicted resource usage). In some examples, resource usage mitigation includes applying the token equivalent of a predicted resource usage associated with a mobile device to a user account associated with the mobile device. In some embodiments, a device management system is configured to transmit computer-executable instructions configured to cause resource usage mitigation so as to offset predicted future resource usage data (e.g., predicted carbon usage/emission) associated with one or more mobile devices for a predetermined future time period with resource usage deficit associated with one or more third-party systems. In some examples, transmitting the computer-executable instructions to offset predicted future resource usage data associated with one or more mobile devices with resource usage deficit (e.g., unused system memory, unused cache memory, unused hard disk space, unused carbon, or the like) associated with a third-party system includes retrieving predicted token equivalent corresponding to the predicted resource usage data.

System Architecture

Methods, apparatuses, systems, and computer readable media, and computer program products of the present disclosure may be embodied by any of a variety of devices in various system architectures. For example, the method, apparatus, system, computer readable media, and computer program product of an example embodiment may be embodied by one or more computing devices, such as a server or other entity, configured to communicate with one or more devices, servers, and/or systems such as mobile devices, third-party systems, and/or the like. Example embodiments include one or more servers configured to facilitate various functions associated with device management, including device analysis, resource usage calculation, resource usage offsetting, and/or one or more additional functions associated with device management. Although some examples show separate servers performing one or more aspects of the present disclosure, it should be understood that such embodiments are merely exemplary and other configurations of servers (e.g., a single server, multiple servers, cloud-based third-party servers, etc.) may be used to perform the various processes and functions described herein. Additionally, or alternatively, methods, apparatuses, systems, computer-readable media, and/or computer program product of an example embodiment may be embodied by one or more software modules configured to perform some or all of the operations performed disclosed herein and executed on one or more hardware modules or systems, such as one or more servers connected to one or more other devices and/or network.

In this regard, FIG. 1 shows an example system environment 100 within which at least some embodiments of the present disclosure may operate. The depiction of environment 100 is not intended to limit or otherwise confine the embodiments described and contemplated herein to any particular configuration of elements or systems, nor is it intended to exclude any alternative configurations or systems for the set of configurations and systems that can be used in connection with embodiments of the present disclosure. Rather, FIG. 1 and the environment 100 disclosed therein is merely presented to provide an example basis and context for the facilitation of some of the features, aspects, and uses of the methods, apparatuses, computer readable media, and computer program products disclosed and contemplated herein. It will be understood that while many of the aspects and components presented in FIG. 1 are shown as discrete, separate elements, other configurations may be used in connection with the methods, apparatuses, computer readable media, and computer programs described herein, including configurations that combine, omit, and/or add aspects and/or components.

Embodiments implemented in a system environment such as system environment 100 advantageously provide for the mitigation of resource usage associated with a mobile device or group of mobile devices by leveraging device triage data and/or other device data associated with the mobile device or group of mobile device to generate predicted future resource usage data using one or more machine learning models, identifying a third-party system associated with resource usage system that may be utilized to offset the predicted future resource usage data, generating a resource usage mitigation data object comprising a resource usage equivalent corresponding to the resource usage deficit, cause rendering of an interface element comprising a visual representation of the resource usage mitigation data object, transmit computer-executable instructions configured to cause resource usage mitigation for the mobile device or group of mobile devices based on the resource usage mitigation data object. Such some embodiments, leverage a hardware and/or software arrangement or environment for the resource usage mitigation data object generation and resource usage mitigation described, contemplated, and/or otherwise disclosed herein.

As shown in FIG. 1, a device management system 101 which is configured to communicate with one or more mobile devices 102A-N, one or more third-party systems 104A-N, one or more provider systems 105A-N, and/or a deficit allocation system 110 to facilitate various functions associated with mitigating resource usage associated with the one or more mobile devices 102A-N.

The device management system 101 may comprise or otherwise leverage one or more subsystems to facilitate and/or perform one or more functions of the device management system 101, including, for example, performing device diagnosis analysis for the one or more mobile device 102A-N, predicting future resource usage for the one or more mobile devices 102A-N, offsetting predicted future resource usage associated with the one or more mobile devices 102A-N, and/or the like.

The device management system 101 may be configured to communicate directly or indirectly with one or more third-party systems to facilitate access to third-party data, access to third-party resources, and/or the like. For example, the device management system 101 may generate resource usage mitigation data objects for offsetting predicted future resource usage associated with a mobile device(s) and/or related processes based on data obtained from one or more third-party systems. The device management system 101 may be configured to communicate with the provider systems 105A-N to facilitate access to provider data with respect to a mobile device or group of mobile devices. For example, the device management system 101 may receive one or more disposition rule sets associated with a mobile device or group of mobile devices from a provider system associated with the mobile device or group of mobile devices. In some example implementations at least a portion of the one or more disposition rule sets may be received from a user. For example, receiving the one or more disposition rule sets may include receiving user preferences with respect to resource usage mitigation, which preferences may be set by a user of the mobile device, a provider, or another third party. The device management system 101 may store the one or more disposition rule sets in a database associated with the device management system 101.

A disposition rule set may comprise instructions, rules, preferences and/or the like configured to be leveraged in one or more stages of a resource usage mitigation process as described herein to perform various functions thereof. In some embodiments, the disposition rule set may include a formula or a set of weighted scores assigned to a plurality of options associated with the device lifecycle, which weighted scores may be used by the device management system to determine predicted resource usage associated with one or more of the options (e.g., the highest ranked option, a list of options, or the like). By way of non-limiting example, in some example implementations, the disposition rule sets may include subsequent use phase disposition instruction sets (e.g., refurbish and resell, recycle, and/or the like) for a mobile device based on a device make/model for the mobile device and/or other device data of the mobile device. As another non-limiting example, the disposition rule sets may include a plurality of resource usage mitigation options that may be rendered on an interface element, wherein a user may select a desired option. For example, at least a portion of the disposition rule sets may be configured to enable a user to choose how much of a predicted future resource usage data associated with one or more mobile devices to offset with resource usage deficit.

As illustrated, the device management system 101 may include one or more subsystems including hardware, software, and/or firmware, for carrying out various functions associated with mitigation resource usage in accordance with at least some embodiments of the present disclosure. In some embodiments, one or more illustrated subsystems may be discrete systems or may be part of larger systems (e.g., device management system 101) without departing from the present disclosure. In some embodiments, one or more illustrated subsystems may be external to the device management system 101. As illustrated, in some embodiments, the one or more subsystems may include a device triage system 106, a resource usage prediction system 108, and/or a resource usage mitigation system 112. In some embodiments, the device triage system 106, resource usage prediction system 108 may be external to the device management system 101 (e.g., a contact center, repair center, warehouse, central hub, and/or the like associated with the device management system 101). In some embodiments, the functions of one or more of the illustrated systems, subsystems, and components may be performed by a single computing device or by multiple computing devices, which devices may be local or cloud based. It will be appreciated that the various functions performed by two or more of the device triage system 106, the resource usage prediction system 108 and the resource usage mitigation system 112 may be performed by a single system. For example, two or more of the device triage system 106, the resource usage prediction system 108 and the resource usage mitigation system 112 may be embodied by a single system comprising one or more sets of computing hardware (e.g., processor(s) and memory) configured to perform various functions thereof. The various functions of the device management system 101 and system environment 100 may be performed by other arrangements of one or more computing devices and/or computing systems without departing from the scope of the present disclosure. In some embodiments, a computing system may comprise one or more computing devices (e.g., server(s)).

The various systems, subsystems, devices, and components illustrated in FIG. 1 may be configured to communicate via one or more communication mechanisms, including wired or wireless connections, such as over a network, bus, or similar connection. For example, a network may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, the network may include a cellular telephone, an 802.11, 802.16, 802.20, and/or WiMAX network. Further, a network may include a public network, such as the Internet, a private network, such as an intranet, or combinations thereof, and may utilize a variety of networking protocols now available or later developed including, but not limited to TCP/IP based networking protocols.

In some embodiments, one or more APIs may be leveraged to communicate with and/or facilitate communication between one or more of the various systems, subsystems, devices, and components illustrated in FIG. 1. For example, the device management system 101 and/or an API platform (e.g., comprising one or more APIs) may be connected to the third-party systems 104A-N via one or more networks. In various embodiments, the subsystems, devices, and components depicted in FIG. 1 as being included in the device management system 101, although not required to be an integral system, may be connected via one or more networks.

The device management system 101 may include a device triage system 106 which may comprise one or more computing devices embodied in hardware, software, firmware and/or a combination thereof configured to facilitate and/or perform various functions associated with the device management system 101. In some embodiments, the device triage system 106 is configured to generate or facilitate generation of device triage data for a mobile device. For example, the device management system 101 may initiate, direct, cause, and/or the like a mobile device to perform one or more diagnostic functions on the mobile device (e.g., internal electronic diagnostics) to generate device triage data based on a result of the one or more diagnostic functions. As another example, the device management system 101 may initiate, direct, cause, and/or the like a device, apparatus, system, and/or the like separate from the mobile device to perform one or more diagnostic functions and/or inspections on a mobile device to generate device triage data for the mobile device (e.g., including a utility measure, such as a device grade, based on a cosmetic inspection using a camera adjacent to the device, which utility measure (e.g., grade) may be determined based on the number, size, and/or severity of external defects, such as cracked screens, detected on the mobile device in the camera image data).

In some embodiments, the device triage data may include one or more defects associated with the mobile device. For example, the device triage data may include at least raw diagnostic data (e.g., test results) and/or conclusions associated with the defect(s) associated with the mobile device (e.g., a grading, determination of a defect, broken part list, scratch count, etc.). In some embodiments, the device triage system 106 is configured to determine defect(s) associated with a mobile device based on the device triage data (e.g., based on raw diagnostic data). For example, the device triage system 106 may be configured to perform, based on device triage data and/or other datasets associated with a mobile device, device diagnosis analysis to identify one or more defects associated with the mobile device. In some embodiments, the device triage system 106 may be configured to identify one or more solutions for a defect associated with a mobile device. The output of the device diagnosis analysis, which may include solution data for resolving a defect; and/or other data, may inform future resource usage associated with the mobile device; resource usage deficit allocation; and/or other resource usage mitigation processes. For example, the solution data associated with a mobile device may be leveraged by the device management system 101 to generate predicted future resource usage data associated with the mobile device. A given solution for a mobile device may be associated with resource usage data that may be included in the predicted future resource usage data for the mobile device (e.g., replacing a phone screen may require additional resource usage, including carbon emissions, which may increase the net resource usage associated with the mobile device). Alternatively or additionally, the device triage system 106 may be configured to output a utility measure (e.g., a grade) for a mobile device based on a result of the device diagnosis analysis.

Device diagnosis, analysis, and repair tools, including without limitation screen crack detection and associated processes and systems as discussed in U.S. Pat. No. 10,332,249, filed Mar. 7, 2017; screen crack detection and device occlusion detection, and associated processes and systems as discussed in U.S. Publication No. 20210081712A1, filed Sep. 16, 2020; mobile device triage processes and systems as discussed in U.S. Pat. No. 9,483,344, filed Mar. 15, 2013; device inspection and grading systems and associated processes and systems as discussed in U.S. Pat. No. 11,580,627, filed Jan. 5, 2021; and device analysis, comparison, and diagnosis tools and associated processes and systems as discussed in U.S. Pat. No. 10,073,754, filed Sep. 13, 2013, which applications/patents are each hereby incorporated by reference herein in their entireties.

As shown in FIG. 1, the device triage system 106 includes a device triage server 106A. The device triage server 106A may be configured for performing various functions associated with the device triage system 106, as described above. As shown in FIG. 1, the device triage system 106 also includes a device triage database 106B. The device triage database 106B may be used to store information associated with device triaging, including device diagnosis analysis and/or past and present solutions data. For example, the device triage database 106B may be used to store data accessed by the device triage server 106A to perform or facilitate performance of the various functions associated with the device triage system. By way of example, the device triage database 106B may be used to store device triage data received from a mobile device. In some embodiments, the device triage server 106A may aggregate the device triage data and/or solutions data from the device triage database 106B to facilitate diagnosis and/or solution prediction (e.g., using a machine learning model trained on the aggregated data, such as by structured learning) for newly received device triage data.

In some embodiments, the device triage system 106 may leverage one or more subsystems, devices, and/or components to perform the various functions of the device triage system 106, in various embodiments, the subsystems may be combined, or their functions performed by a single integrated device triage system. In some embodiments, the device triage system 106 may comprise a triage subsystem. In some embodiments, the triage subsystem may comprise hardware, software, and/or firmware configured to perform one or more device triage operations on a device. In some embodiments, the triage subsystem may comprise hardware, software, and/or firmware configured receive instruction(s), signal(s) and/or data from one or more subsystems and/or components associated with the device management system 101 and facilitate and/or perform one or more device triage operations responsive to the received instruction(s), signal(s) and/or data. In one example embodiment, the triage subsystem may comprise hardware, software, and/or firmware configured to receive instruction(s), signal(s) and/or data from one or more of the systems, subsystems, devices, and/or components associated with the device management system 101, and perform one or more device triage operations (e.g., device triaging, device diagnosis analysis, and/or the like) in response to the one or more instructions, signals, and/or data. In some embodiments, the triage subsystem may comprise hardware, software, and/or firmware configured to communicate with a mobile device to facilitate and/or perform device triage operation(s). For example, the triage subsystem may embody a computer link (e.g., USB and/or other computer link) for connecting the triage subsystem to a mobile device to allow the triage subsystem to facilitate and/or perform triage operation(s) on the mobile device.

The device triage system 106 may comprise an inspection subsystem. In some embodiments, the inspection system may comprise hardware, software, and/or firmware configured to execute one or more inspection operations on a device. In some embodiments, the inspection subsystem may comprise hardware, software, and/or firmware configured to receive instruction(s), signal(s) and/or data from one or more systems, subsystems, devices, and/or components associated with the device management system 101 and facilitate and/or perform one or more device inspection operations responsive to the received instruction(s), signal(s) and/or data. By way of non-limiting example, the inspection system may include one or more conveyors configured to receive and convey one or more mobile devices for inspection; one or more robotic arms configured to hold one or more mobile devices for inspection; an imaging system including one or more cameras for capturing images of one or more mobile devices for inspection; and/or an electronic analysis system configured to electrically communicate (e.g., wirelessly or via USB) with one or more mobile devices for electronically inspecting the mobile devices (e.g., running diagnoses, collecting data from the device(s), wiping and/or modifying the memory of the device(s), etc.).

The device triage system 106 may comprise a grading subsystem. In some embodiments, the grading system may comprise hardware, software, and/or firmware configured to grade a mobile device (e.g., assign one or more grades to a mobile device). In some embodiments, the grading system may comprise hardware, software, and/or firmware configured to determine a utility measure (e.g., a grade) for a mobile device based on instruction(s), signal(s) and/or data received from one or more systems, subsystems, devices, and/or components associated with the device triage system 106. In one example embodiment, the inspection system may comprise hardware, software, and/or firmware configured to receive signal(s) and/or data from the triage subsystem and/or inspection system and process the received signal(s) and/or data to determine one or more grades for a mobile device. The received signal(s) and/or data may comprise or otherwise reflect one or more of results of device triage operations performed on the mobile device by the triage subsystem or inspection operations performed on the mobile device by the inspection system. In some embodiments the grading subsystem may include one or more imaging devices and/or physical and/or electronic interfaces for inspecting and determining a utility measure (e.g., a grade) associated with the mobile device. In some embodiments, the utility measure may be based on the condition of the device (e.g., the presence, absence, and/or severity of one or more defects). In some embodiments, a mobile device resource usage model discussed herein may receive a utility measure (e.g., device grade) as input which may inform if a mobile device is allocated to a subsequent use phase (e.g., versus immediately being sent to end-of-life processes) and/or the type of subsequent use phase.

The device triage system 106 may comprise a solution subsystem. In some embodiments, the solution system may comprise hardware, software, and/or firmware configured to determine solutions data for a mobile device. In some embodiments, the solutions data may include data indicative of one or more candidate solutions for resolving a defect associated with a mobile device. In some embodiments, a machine learning model, such as the model(s) described herein, may be configured to identify one or more solutions to a detected defect.

In some embodiments, the device triage system 106 may comprise hardware, software, and/or firmware configured to communicate with one or more other systems, subsystems, devices, and/or components of the device management system 101. In some embodiments, the device triage system 106 may comprise hardware, software, and/or firmware configured to provide one or more outputs of the device triage system (e.g., device triage output of the triage subsystem, device inspection output of the inspection subsystem, grading output of the grading subsystem) to the resource usage prediction system 108 and/or the resource usage mitigation system 112. By way of non-limiting example, the device triage system 106 (e.g., via the solution subsystem) or resource usage mitigation system 112 may include one or more physical apparatuses for affecting a solution, including but not limited to one or more repair robots configured to perform or facilitate performance of one or more repairs on one or more mobile devices; one or more conveyor systems for transporting one or more mobile devices; and/or one or more packaging systems for controlling disposition of a mobile device, along with processing hardware and software associated with any of the foregoing.

In some embodiments, the device triage system 106 may comprise hardware, software, and/or firmware configured to communicate with one or more subsystems and/or components to initiate or direct execution of a selected solution or solutions. For example, in some embodiments, resource usage mitigation system 112 may comprise hardware, software, and/or firmware configured to communicate with one or more systems, subsystems, and/or components to cause the one or more systems, subsystems, and/or components to perform various functions on a mobile device corresponding to the selected solution(s). For example, the resource usage mitigation system 112 may direct one or more assemblies (e.g., machinery, equipment, etc.) and/or systems to perform various functions on the mobile device, such as repair functions, refurbishment functions, and/or other functions associated with a selected solution for the device. In some embodiments, a solution may include computer-executable instructions configured to cause one or more assemblies to direct the device to a particular location (e.g., configuring a sorting machine, such as a robotic arm or a sortation conveyor) to facilitate execution of the solution.

The resource usage prediction system 108 may comprise one or more computing devices embodied in hardware, software, firmware and/or a combination thereof configured to facilitate and/or perform various functions associated with the device management system 101. The resource usage prediction system 108 may comprise hardware, software, and/or firmware configured to communicate with one or more subsystems, devices, and/or components associated with the device management system 101 to facilitate performance of one or more functions of the resource usage prediction system 108. In some embodiments, the resource usage prediction system 108 may comprise hardware, software, and/or firmware configured to receive instructions, signals, data, and/or the like originating from a subsystem, device, and/or component associated with the device management system 101. In some embodiments, the instructions, signals, data, and/or the like may be associated with or otherwise indicate a request for predicted future resource usage data associated with a mobile device or a group of mobile devices.

In some embodiments, the resource usage prediction system 108 leverages one or more models to generate output data that may be used to facilitate mitigation of resource usage associated with a mobile device or a group of mobile devices in an environment. In certain embodiments, the one or more models includes a mobile device resource usage model configured for predicting future resource usage associated with a mobile device or group of mobile devices. The mobile device resource usage model may include any type of machine learning model including one or more supervised, unsupervised, semi-supervised, reinforcement learning models, and/or the like. The mobile device resource usage model may include multiple models configured to perform one or more different stages of a prediction process and/or configured to be used alternately depending on the situation (e.g., the device identifier data, device triage data, device solution data, and/or other device lifecycle and/or resource usage data). In some example implementations, the mobile device resource usage model may be trained based on historical data aggregated from a plurality mobile devices over multiple use phases of their lifecycles (e.g., device data, device triage data, and actual resource usage data associated with the plurality of mobile devices)

As shown in FIG. 1, the resource usage prediction system 108 includes a resource usage prediction server 108A. The resource usage prediction server 108A may be configured for performing various functions associated with future resource usage prediction, including receiving and/or accessing various data that may be used to predict future resource usage associated with a mobile device or a group of mobile devices. For example, the resource usage prediction server 108A may receive one or more datasets from one or more systems, subsystems, devices, and/or components illustrated in FIG. 1 to facilitate generation of predicted resource usage data associated with a predetermined past, present, and/or future time period.

As shown in FIG. 1, the resource usage prediction system 108 also includes a resource usage prediction database 108B that may be used to store information associated with resource usage prediction. For example, the resource usage prediction database 108B may be used to store data associated with request data objects, mobile devices, users, solutions for resolving device defects, channels contributing to resource usage, processes contributing to resource usage, and/or other data related to efficient and accurate modeling and prediction of resource usage for mobile devices, device lifecycle, and/or related processes. The resource usage prediction database may also be used to store predicted resource usage data associated with a mobile device, mobile device resource usage model configuration data, training data for the mobile device resource usage model, and/or other datasets associated with a mobile device resource usage model.

The resource usage prediction database 108B may be accessed by the resource usage prediction server 108A and may be used to store any additional information accessed by and/or otherwise associated with the resource usage prediction system 108 such as device triage data, disposition rule sets, predicted, and/or other datasets associated with a mobile device. For example, the resource usage prediction database 108B may store data that the resource usage prediction system 108 may utilize when predicting resource usage data, and/or predicting other data associated with mitigating resource usage. In some embodiments, the resource usage prediction database 108B may be configured for access by other subsystems and/or components of the device management system 101.

In some embodiments, the device management system 101 may include a modeling system 114 which may comprise one or more computing devices embodied in hardware, software, firmware and/or a combination thereof configured to facilitate and/or perform various functions associated with the device management system. In some embodiments, the modeling system 114 may comprise hardware, software, and/or firmware configured to generate, train, retrain, and/or update one or more models, such as a mobile device resource usage model. In some embodiments, the modeling system 114 may comprise hardware, software, and/or firmware configured to interact with one or more data sources (e.g., resource usage prediction database 108B, or any other system-internal or external data source) to receive a broad range of data that may be used to generate the one or more models in accordance with the modeling functions of the various embodiments herein. In some embodiments, the modeling system may include a modeling server 114A configured to facilitate and/or perform one or more functions of the modeling system. In some embodiments, the modeling system may include a modeling database 114B that may be used to store data that the resource usage prediction system 108 may utilize when modeling resource usage or other related processes. For example, the modeling database 114B may store model(s) generated by the modeling system 114 (e.g., a modeling engine thereof) Additionally, in some embodiments, the modeling database 114B may be used to store any additional data accessed by and/or otherwise associated with the modeling system 114. The modeling database 114B may be accessed by the modeling server 114A to facilitate various functions thereof. Additionally, in some embodiments, the modeling database 114B may be configured for access by other subsystems and/or components of the device management system 101. In some embodiments, the modeling system 114 may be embodied by the resource usage prediction system 108 or other subsystems or components of the device management system 101.

Modeling, including without limitation generating one or more models (such as a mobile device resource usage model), are discussed in U.S. application Ser. No. 18/348, 894 filed Jul. 7, 2023 and U.S. application Ser. No. 18/348, 889 filed Jul. 7, 2023, and fault analysis modeling is discussed in U.S. Pat. No. 10,073,754, filed Sep. 13, 2013, which applications are each hereby incorporated by reference herein in their entireties.

The resource usage mitigation system 112 may comprise one or more computing devices embodied in hardware, software, firmware and/or a combination thereof configured to facilitate and/or perform various functions associated with the device management system 101, including identifying resource usage deficits, generating resource usage mitigation data object(s) for a mobile device or group of mobile devices, causing rendering of an interface element to a user associated with the mobile device, and transmitting instructions, signals, and/or data configured to cause resource usage mitigation for the mobile device or group of mobile devices. In some embodiments, the resource usage mitigation system 112 may be configured to control one or more of the subsystems and/or components of the device management system 101.

The resource usage mitigation system 112 may comprise hardware, software, and/or firmware configured to communicate directly or indirectly (e.g., via deficit allocation system 110) with one or more third-party systems to manage the identification, sourcing, and/or allocation of resource usage deficits (e.g., directly or via token equivalent) for offsetting predicted future resource usage associated with a mobile device or group of mobile devices. For example, the resource usage mitigation system 112 may communicate with one or more third-party systems associated with a third party to source and/or direct the third-party system to assign/allocate resource usage deficit associated with the third-party system to one or more mobile devices or otherwise acquire resource usage deficit associated with the third-party system (e.g., directly or via toke equivalent).

The resource usage mitigation system 112 may be configured to offset predicted future resource usage associated with a mobile device with a resource usage deficit identified in association with a third-party system. The resource usage mitigation system 112 may be configured to trigger computer-executable instructions configured to use the resource usage deficit associated with the third-party system to offset predicted future resource usage associated with a mobile device or group of mobile devices (e.g., a first mobile device and/or a second mobile device as described in some examples herein) to improve the resource usage efficiency score of the respective mobile devices via resource usage mitigation. A resource usage efficiency score for a mobile device may describe a measure of resource usage associated with a mobile device that is offset with resource usage deficit associated with a third-party system.

The resource usage mitigation system 112 may be configured to perform a resource usage offset (e.g., the prediction of the predicted resource usage and the offsetting of the predicted resource usage via a token equivalent or other resource usage deficit equivalent) for one or more mobile devices based on predicted future resource usage data associated with the one more mobile devices and generate resource usage mitigation data object(s) configured to facilitate resource usage mitigation via the resource usage offset operation. For example, the resource usage mitigation system 112 may be configured to determine a token equivalent or resource usage equivalent corresponding to a predicted future resource usage data for a mobile device or group of mobile devices based on the predicted future resource usage data, data associated with one or more third-party systems (e.g., resource usage deficit exchange rate, resource usage deficit type, amount of resource usage deficit, and/or the like), and/or disposition rule set(s) associated with the mobile device or group of mobile devices. A resource usage mitigation data object associated with a mobile device may comprise a predicted token equivalent or other resource usage equivalent for the predicted future resource usage data associated with the mobile device configured to offset the predicted resource usage. In some embodiments, the resource usage mitigation data object may be used to offset the future predicted resource usage with a resource usage deficit of a third-party system, such that a net resource of one or more mobile devices, including the third-party systems is less than or equal to a maximum allowable resource usage threshold.

As shown in FIG. 1, the resource usage mitigation system 112 includes a resource usage mitigation server 112A. The resource usage mitigation server 112A may be configured to facilitate and/or perform one or more functions of the resource usage mitigation system 112 as describe above. As shown in FIG. 1, the resource usage mitigation system 112 includes a resource usage mitigation database 112B configured to store various data associated with generating resource usage mitigation data objects and/or resource usage mitigation for a mobile device or group of mobile devices.

In some embodiments, the resource usage mitigation system 112 may communicate with one or more third party systems and/or may communicate with the deficit allocation system 110 and the deficit allocation system 110 may communicate with one or more third party systems to facilitate identification and/or selection of a third-party system or subset of third-party systems from the one or more third-party systems to offset predicted future resource usage data associated with one or more mobile devices with resource usage deficit associated with the third-party system or subset of third-party systems.

In some embodiments, the deficit allocation system 110 may be configured to receive instructions, signal, and/or data configured to trigger or otherwise cause the deficit allocation system 110 to communicate in real-time or near real-time with one or more third-party systems to access various data that comprise or may be used to select the third-party system or subset of third-party systems, determine resource usage equivalent (e.g., token equivalent, or the like), and/or perform other resource usage mitigation processes. In some embodiments, the deficit allocation system 110 may communicate with the one or more third-party systems 104A-104N via one or more APIs.

In some embodiments, the deficit allocation system 110 may communicate with the third-party systems asynchronously and/or independently of communication between the deficit allocation system 110 and the device management system 101. In such embodiments, at least the deficit allocation system 110 and the device management system 101 may communicate in real time or near real time to facilitate the device management system 101 requesting and receiving the resource usage equivalent in connection with generating the resource usage mitigation data object. In some embodiments, the deficit allocation system 110 may maintain an inventory of token equivalents or other resource usage equivalents that is periodically or continually replenished from the one or more third-party systems (e.g., on demand). The device management system 101 may thereby also receive the resource usage equivalents on demand without requiring real-time communication between the device management system and the third-party system(s) (e.g., similar to a clearinghouse). At the time of replenishment, the exchange rate of the resource usage equivalent to resource usage deficit may be established and may be incorporated into future resource usage mitigation data objects.

As described above, in some embodiments, the deficit allocation system 110 may comprise or otherwise associated with a system that is separate from the device management system 101. In such some embodiments, the device management system 101 may comprise an external system (e.g., not embodied by the device management system 101).

Example Apparatuses of the Disclosure

Having discussed example systems in accordance with the present disclosure, example apparatuses in accordance with the present disclosure will now be described.

Figure 2:
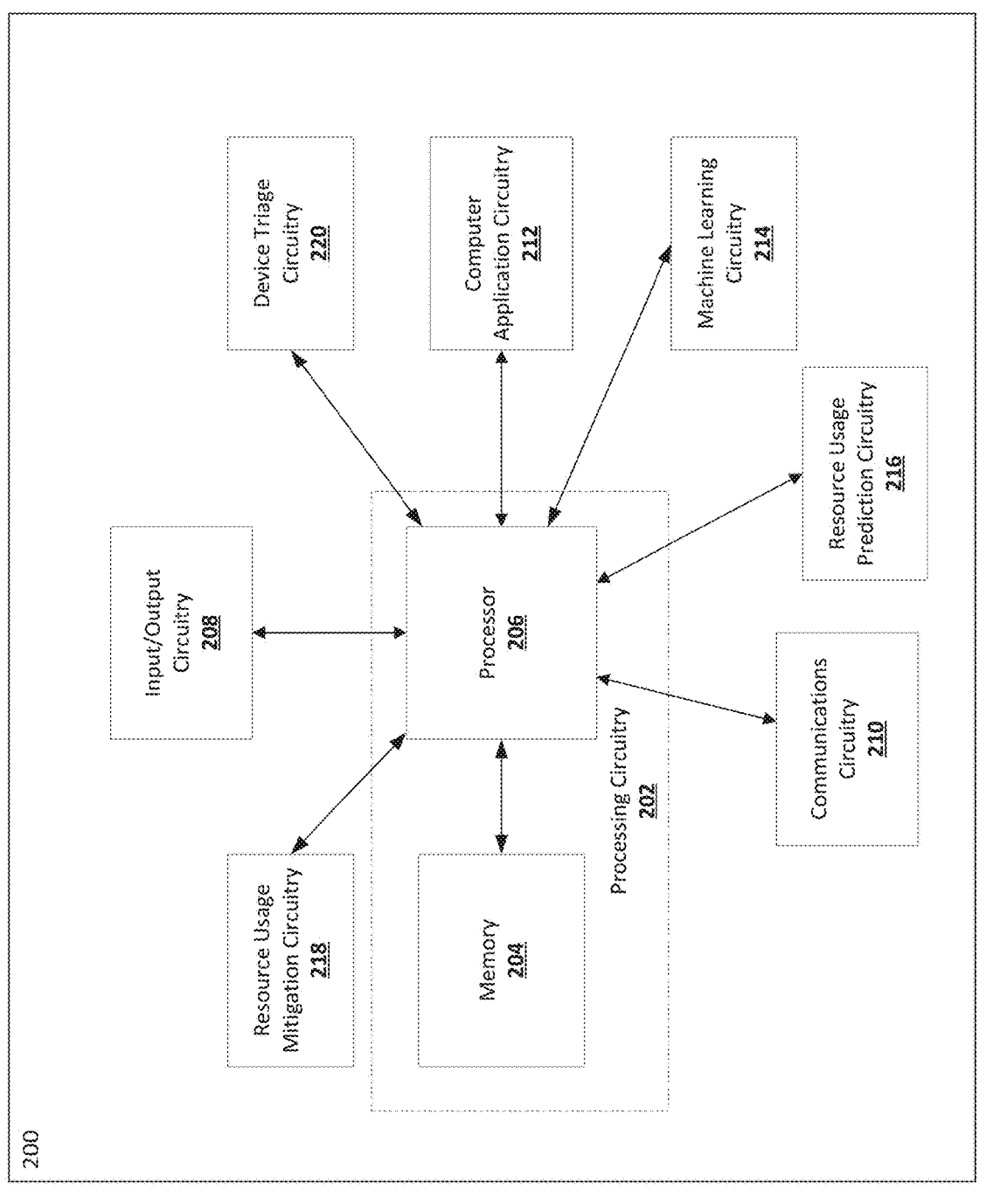
FIG. 2 illustrates a block diagram of an apparatus that may be specifically configured, within which at least some embodiments of the present disclosure may operate.

FIG. 2 illustrates a block diagram of an apparatus 200 in accordance with some example embodiments. For example, in some embodiments, device management system 101 (or one or more portions (e.g., one or more individual systems) thereof), if embodied in a particular embodiment, may be embodied by one or more apparatuses 200. In some embodiments, the device management system 101 may include a processing circuitry 202 as shown in FIG. 2 with respect to the apparatus 200. It should be noted, however, that the components, or elements illustrated in and described with respect to FIG. 2 below may not be mandatory and thus one or more may be omitted in certain embodiments. Additionally, some embodiments, may include further or different components or elements beyond those illustrated in and described with respect to FIG. 2. In some embodiments, the functionality of the device management system 101 or any subset thereof may be performed by a single apparatus 200 or multiple apparatuses 200. In some embodiments, the apparatus 200 may comprise one or a plurality of physical devices.

Although components are described with respect to functional limitations, it should be understood that the particular implementations necessarily include the use of particular computing hardware, such as the hardware shown in FIG. 2. It should also be understood that certain of the components described herein may include similar or common hardware. For example, two sets of circuitries for example, may both leverage use of the same processor(s), network interface(s), storage medium(s), and/or the like, to perform their associated functions, such that duplicate hardware is not required for each set of circuitry. The user of the term "circuitry" as used herein with respect to components of the apparatuses described herein should therefore be understood to include particular hardware configured to perform the functions associated with the particular circuitry as described herein.

In some embodiments, "circuitry" may include processing circuitry, storage media, network interfaces, input/output devices, and/or the like. In some embodiments, other elements of the apparatus 200 may provide or supplement the functionality of another particular set of circuitry. For example, the processor 206 in some embodiments provides processing functionality to any of the sets of circuitries, the memory 204 provides storage functionality to any of the sets of circuitry, the communications circuitry 210 provide network interface functionality to any of the sets of circuitry, and/or the like.

The apparatus 200 may include or otherwise be in communication with processing circuitry 202 that is configurable to perform actions in accordance with one or more example embodiments disclosed herein. In this regard, the processing circuitry 202 may be configured to perform and/or control performance of one or more functionalities of the apparatus 200 in accordance with various example embodiments, and thus may provide means for performing functionalities of the apparatus 200 in accordance with various example embodiments. The processing circuitry 202 may be configured to perform data processing, application and function execution, and/or other processing and management services according to one or more example embodiments. In some embodiments, the apparatus 200 or a portion(s) or component(s) thereof, such as the processing circuitry 202, may be embodied as or comprise a chip or chip set. In other words, apparatus 200 or the processing circuitry 202 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 200 or the processing circuitry 202 may therefore, in some cases, be configured to implement an embodiment of the disclosure on a single chip or as a single "system on a chip." As such, in some cases, a chip or chipset may constitute means for performing one or more operations for providing the functionalities described herein.

In some embodiments, the processing circuitry 202 may include a processor 206 (and/or co-processor or any other processing circuitry assisting or otherwise associated with the processor) and, in some embodiments, such as that illustrated in FIG. 2, may further include memory 204. The processing circuitry 202 may be in communication with or otherwise control a user interface (e.g., embodied by input/output circuitry 208), a communications circuitry 210, and/or a computer application circuitry 212. As such, the processing circuitry 202 may be embodied as a circuit chip (e.g., an integrated circuit chip) configured (e.g., with hardware, software or a combination of hardware and software) to perform operations described herein.

The processor 206 may be embodied in a number of different ways. For example, the processor 206 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. Although illustrated as a single processor, it will be appreciated that the processor 206 may comprise a plurality of processors. The plurality of processors may be in operative communication with each other and may be collectively configured to perform one or more functionalities of the apparatus 200 as described herein. In some example embodiments, the processor 206 may be configured to execute instructions stored in the memory 204 or otherwise accessible to the processor 206. As such, whether configured by hardware or by a combination of hardware and software, the processor 206 may represent an entity (e.g., physically embodied in circuitry—in the form of processing circuitry 202) capable of performing operations according to embodiments of the present disclosure while configured accordingly. Thus, for example, when the processor 206 is embodied as an ASIC, FPGA or the like, the processor 206 may be specifically configured hardware for conducting the operations described herein. Alternatively, as another example, when the processor 206 is embodied as an executor of software instructions, the instructions may specifically configure the processor 206 to perform one or more operations described herein. The use of the terms "processor" and "processing circuitry" may be understood to include a single core processor, a multi-core processor, multiple processors internal to the apparatus 200, and/or one or more remote or "cloud" processor(s) external to the apparatus 200.

In some example embodiments, the memory 204 may include one or more non-transitory memory devices such as, for example, volatile and/or non-volatile memory that may be either fixed or removable. In this regard, the memory 204 may comprise a non-transitory computer-readable storage medium. It will be appreciated that while the memory 204 is illustrated as a single memory, the memory 204 may comprise a plurality of memories. The memory 204 may be configured to store information, data, applications, instructions and/or the like for enabling the apparatus 200 to carry out various functions in accordance with one or more example embodiments. For example, the memory 204 may be configured to buffer input data for processing by the processor 206. Additionally or alternatively, the memory 204 may be configured to store instructions for execution by the processor 206. As yet another alternative, the memory 204 may include one or more databases that may store a variety of files, contents, or data sets. Among the contents of the memory 204, applications may be stored for execution by the processor 206 in order to carry out the functionality associated with each respective application. In some cases, the memory 204 may be in communication with one or more of the processors 206, user interface 208, communications circuitry 210, or computer application circuitry 212 via a bus(es) for passing information among components of the apparatus 200.

The input/output circuitry 208 may provide output to the user or an intermediary device and, in some embodiments, may receive one or more indication(s) of user input. In some embodiments, the input/output circuitry 208 is in communication with processor 206 to provide such functionality. The input/output circuitry 208 may include one or more user interface(s) and/or include a display that may comprise the user interface(s) rendered as a web user interface, an application interface, and/or the like, to the display of a user device, a backend system, or the like. The input/output circuitry 208 may be in communication with the processing circuitry 202 to receive an indication of a user input at the user interface and/or to provide an audible, visual, mechanical, or other output to the user. As such, the input/output circuitry 208 may include, for example, a keyboard, a mouse, a joystick, a display, a touch screen display, a microphone, a speaker, and/or other input/output mechanisms. As such, the input/output circuitry 208 may, in some example embodiments, provide means for a user to access and interact with the apparatus 200. The processor 206 and/or input/output circuitry 208 comprising or otherwise interacting with the processor 206 may be configured to control one or more functions of one or more user interface elements through computer program instructions (e.g., software and/or firmware) stored on a memory accessible to the processor 206 (e.g., stored on a memory 204, and/or the like).

The communications circuitry 210 may include one or more interface mechanisms for enabling communication with other devices and/or networks. In some cases, the communications circuitry 210 may be any means such as a device or circuitry embodied in either hardware, or a combination of hardware and software that is configured to receive and/or transmit data from/to a network and/or any other device or module in communication with the processing circuitry 202. The communications circuitry 210 may, for example, include an antenna (or multiple antennas) and supporting hardware and/or software for enabling communications with a wireless communication network (e.g., a wireless local area network, cellular network, global positing system network, and/or the like) and/or a communication modem or other hardware/software for supporting communication via cable, digital subscriber line (DSL), universal serial bus (USB), Ethernet or other methods.

In some embodiments, the processor 206 (or the processing circuitry 202) may be embodied as, include, or otherwise control a computer application circuitry 212. As such, the computer application circuitry 212 may be embodied as various means, such as circuitry, hardware, a computer program product comprising computer readable program instructions stored on a computer readable medium (for example, the memory 204) and executed by a processing device (for example, the processor 206), or some combination thereof. The computer application circuitry 212 may be capable of communication with one or more of the memory 204, input/output circuitry 208, or communications circuitry 210 to access, receive, and/or send data as may be needed to perform one or more of the functionalities of the computer application circuitry 212, including some or all of the functions associated with the system or component embodied by the apparatus 200 as described herein. In accordance with some example embodiments, the computer application circuitry 212 may provide means for implementing and controlling functionality of a computer application associated with the embodiments disclosed herein.

In some embodiments, the apparatus 200 may include a device triage circuitry 220, which may include hardware components, software components, and/or a combination thereof designed or configured to interface with a mobile device to execute or cause execution of one or more operations on the mobile device, such as device triage, device inspection, device grading, device repair, device refurbishment, and/or the like. The device analysis circuitry may facilitate access to data used by one or more other components through the use of applications or APIs executed using a processor, such as the processor 206. However, it should also be appreciated that, in some embodiments, the device triage circuitry 220 may include a separate processor, specially configured field programmable gate array (FPGA), or application specific interface circuit (ASIC) to manage the access and use of the relevant data. The device triage circuitry 220 may provide for communication with other components of the apparatus, system and/or external systems via a network interface provided by the communications circuitry 210.

In some embodiments, the apparatus 200 may include a resource usage prediction circuitry 216 which may include hardware components, software components, and/or a combination thereof designed or configured to generate, maintain, update, and provide access to one or more models and/or data used by the one or more models to model and/or to generate output that may be used to facilitate resource usage mitigation, including but not limited to future resource usage data associated with a mobile device or a group of mobile devices. The resource usage prediction circuitry 216 may facilitate access to data used by the one or more models (e.g., models generated and/or operated at the machine learning circuitry 214) through the use of applications or APIs executed using a processor, such as the processor 206. It should also be appreciated that, in some embodiments, the resource usage prediction circuitry 216 may include a separate processor, specially configured field programmable gate array (FPGA), or application specific interface circuit (ASIC) to manage the access and use of the relevant data. The resource usage prediction circuitry 216 may also provide for communication with other components of the apparatus, system and/or external systems via a network interface provided by the communications circuitry 210. The resource usage prediction circuitry 216 may therefore be implemented using hardware components of the apparatus configured by either hardware or software for implemented the various functions.

In various embodiments, the apparatus 200 may include machine learning circuitry 214, which may include hardware components, software components, and/or a combination thereof designed or configured to request, receive, process, generate, and transmit data, data structures, control signals, and electronic information for training and executing one or more trained machine learning model configured to facilitate the functionalities described herein, including generating, aggregating, assembly, adjusting, and/or updating future resource usage with respect to one or more mobile devices. The one or more machine learning models may include any type of machine learning model including one or more supervised, unsupervised, semi-supervised, reinforcement learning models, and/or the like. In some examples, the one or more machine learning models includes a mobile device resource usage model. The machine learning circuitry 214 may operably couple with the resource usage prediction circuitry 216, device triage circuitry 220, resource usage mitigation circuitry 218, computer application circuitry 212 and/or any other apparatus or component to facilitate one or more of the various processes described herein. The machine learning circuitry 214 may provide for communication with other components of the apparatus, system, and/or external systems via a network interface provided by the communications circuitry 210.

In some embodiments, the apparatus 200 may include a resource usage mitigation circuitry 218, which may include hardware components, software components, and/or a combination thereof designed or configured to initiate, direct, and/or manage mitigation of resource usage associated with one or more mobile devices. The resource usage mitigation circuitry 218 may facilitate access to data used by one or more other components through the use of applications or APIs executed using a processor, such as the processor 206. However, it should also be appreciated that, in some embodiments, the resource usage mitigation circuitry 218 may include a separate processor, specially configured field programmable gate array (FPGA), or application specific interface circuit (ASIC) to manage the access and use of the relevant data. The resource usage mitigation circuitry 218 may provide for communication with other components of the apparatus, system, and/or external systems via a network interface provided by the communications circuitry 210.

Example Processes for Resource Usage Mitigation

Figure 3:
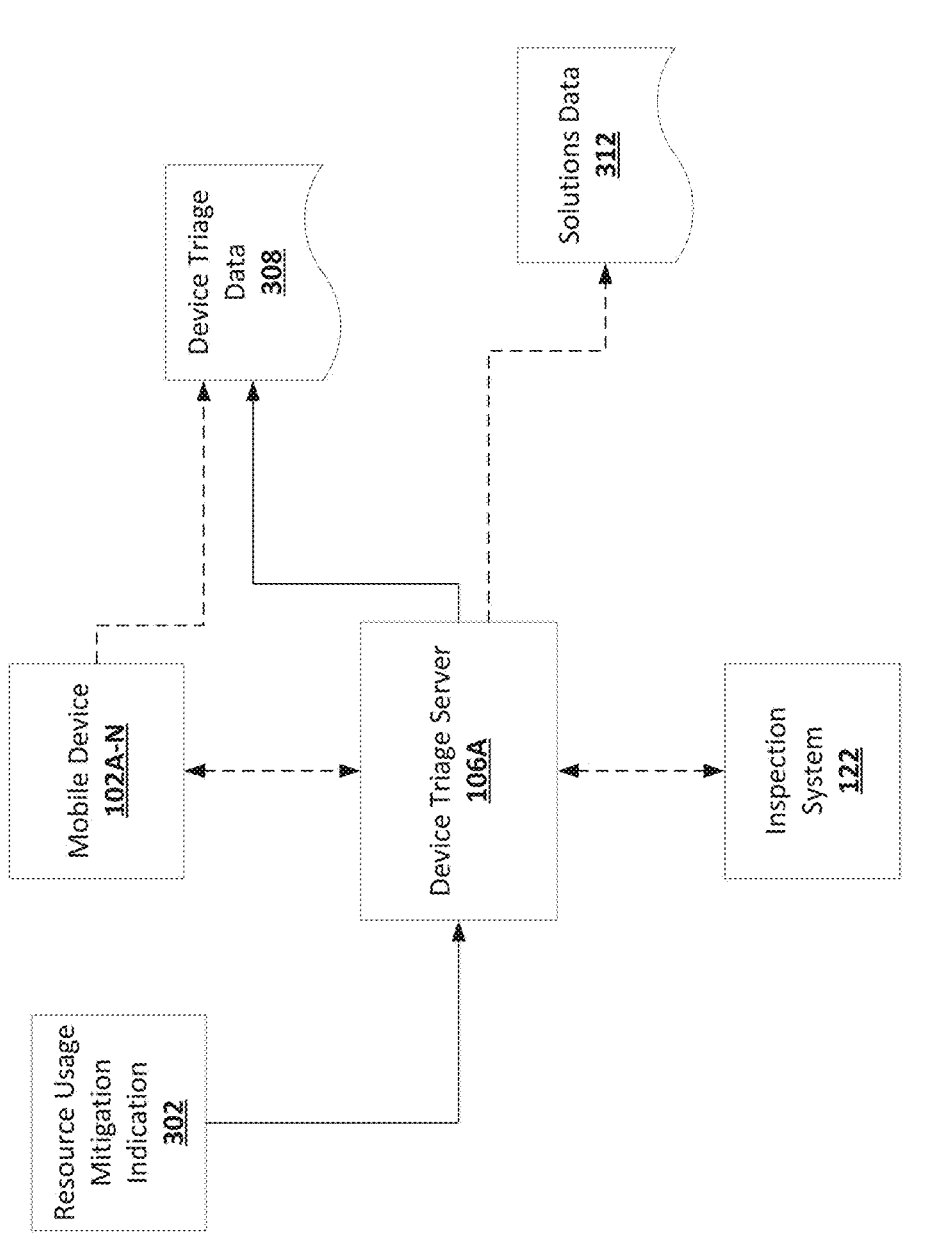
FIG. 3 illustrates an example data flow for generating device triage data in accordance with at least some embodiments of the present disclosure.

FIG. 3 is a block diagram showing an example data flow that may be used in connection with resource usage mitigation for a mobile device. Specifically FIG. 3 is a block diagram of an example data flow 300 for generating device triage data for a mobile device.

As shown in FIG. 3, a device triage server 106A may be configured to receive a resource usage mitigation indication 302 associated with a mobile device. The resource usage mitigation indication 302 (e.g., a use phase termination indication, request, prompt, or the like configured to trigger the resource usage mitigation process) may comprise instructions, signals, and/or data configured to trigger a resource usage mitigation process as described herein. In some embodiments, upon receipt of the resource usage mitigation indication 302, the device triage server 106A may trigger generation of, receive, retrieve, and/or generate device triage data 308A associated with the mobile device. In some example implementations, the device triage data may comprise electronic diagnostic triage data (e.g., performance data, systems data, defect data, and/or the like) associated with the electronic functioning of one or more components of the mobile device and may be retrieved from a memory of the mobile device or otherwise received from the mobile device (e.g., via connecting with a software application installed on the mobile device and instructing the software application to run one or more diagnostic functions on the mobile device) or an inspection system 122 configured to inspect the mobile device. In some embodiments, the device triage server 106A may generate device triage data 308 after receipt of data from the mobile device and/or an inspection system 122 configured to inspect the mobile device.

In some example implementations, the mobile device (e.g., a mobile smartphone) may include hardware, software, firmware and/or a combination thereof configured to cause the mobile device to execute one or more diagnostic functions on the mobile device to generate the electronic diagnostic triage data based on a result of the one or more diagnostic functions. The mobile device may include hardware, software, firmware and/or a combination thereof configured to cause the mobile device to transmit device data, including the device triage data, directly or indirectly to the device triage server 106A. For example, the mobile device may comprise at least one processor and at least one non-transitory memory comprising computer program code, wherein the at least one non-transitory memory and the computer program code are configured to, with the at least one processor, cause the mobile device to execute one or more diagnostic functions on the mobile device to generate at least device triage data based on a result of the one or more diagnostic functions and transmit device data, including the device triage data, directly or indirectly to one or more device management servers. In some embodiments, the mobile device may include one or more software applications installed in the at least one memory that are configured to facilitate execution of the one or more diagnostic functions, transmit a resource usage mitigation indication, and/or permit one or more other functions of the mobile device.

In some example implementations, the device triage server 106A may be configured to facilitate generation of the electronic diagnostic triage data and/or inspection data for the mobile device. For example, the device triage server 106A may cause the mobile device to execute one or more functions on the mobile device to generate device triage data comprising electronic diagnostic triage data based on the one or more diagnostic functions. The device triage server 106A may also cause an inspection system 122 to execute one or more inspection functions (e.g., physical inspection or the like) on the mobile device to generate device triage data comprising inspection data based on the one or more inspection functions. The inspection system 122 may include sensing devices, such as a camera. In this regard, the device triage data 308 may comprise diagnostic data and/or inspection data for the mobile device.

In some embodiments, the device triage server 106A may process data received from the mobile device and/or inspection system to generate the device triage data, which may include an indication of a defect, a utility measure (e.g., a grade), or the like. For example, the device triage server 106A may be configured to perform device diagnosis analysis based on the data received from the mobile device and/or the inspection system 122 to generate device triage data which may include an indication of a defect (e.g., damaged screen, damaged mobile device camera, and/or the like), a utility measure, or the like. For example, the inspection system 122 may include a camera or other imaging device which may capture image data associated with the mobile device to generate device triage data (e.g., defect detection, which may include but is not limited to cosmetic grading). The device triage server 106A may output device triage data from whichever source is utilized, whether alone or in combination, for a mobile device. Alternatively or additionally, the device triage server 106A may be configured to output solutions data comprising one or more solutions for resolving defect(s) associated with the mobile device.

In some embodiments, a solution may describe a potential resolution for a defect associated with a mobile device. In some examples, a solution may include a disposition of the device (e.g., sale, recycling, or the like). In some embodiments, the solution data may include a plurality of solutions (e.g., a ranked list) from which the resource usage mitigation server or another portion of the device management system 101 may choose a solution (e.g., based on a highest likelihood of resolving a detected defect, based on a disposition rule set, or based on any other criteria). In some examples, a solution may include no modification to the device, such as in the event that the defect cannot be repaired or is not worth repairing as programmatically determined.

Figure 4:
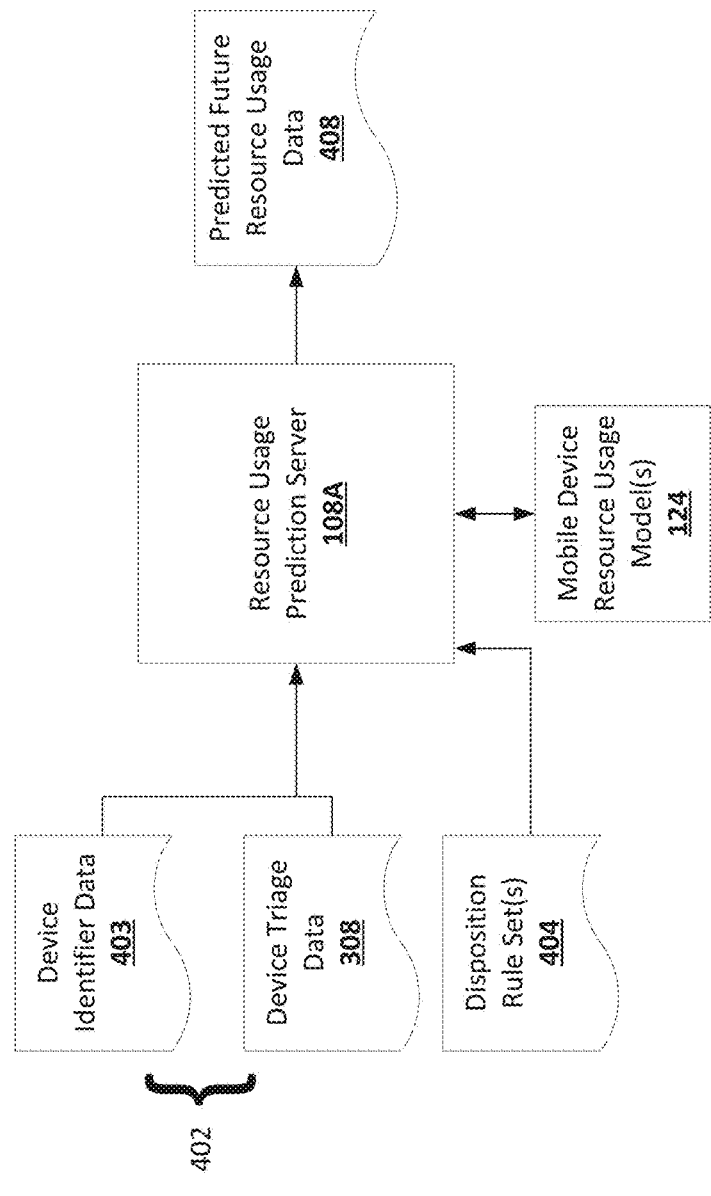
FIG. 4 illustrates an example data flow for generating resource usage data in accordance with at least some embodiments of the present disclosure.

FIG. 4 is a block diagram showing another example data flow that may be used in connection with resource usage mitigation for a mobile device. Specifically FIG. 4 is a block diagram of an example data flow 400 for predicting future resource usage data associated with a mobile device or group of mobile devices.

As shown in FIG. 4, a resource usage prediction server 108A is configured to receive at least a portion of device data associated with the mobile device. The device data 402 may include a device identifier 403 for the mobile device, device triage data 308A for the mobile device, or device triage data 308B for the mobile device. The device data may be received by the resource usage prediction server 108A from one or more sources (e.g., a mobile device, third party, or one or more portions of the device management system) and in any combination of timings (e.g., real-time versus stored). Other example data sources are described in U.S. application Ser. No. 18/348,894 filed Jul. 7, 2023, and U.S. application Ser. No. 18/348,889 filed Jul. 7, 2023, in addition to U.S. Patent No. 10,073,754, filed Sep. 13, 2013, which applications are each hereby incorporated by reference herein in their entireties.

In some embodiments, the device data may include any data usable for resource usage prediction, including other data generated by the mobile device and/or other data generated about the mobile device. Device data may be defined by or otherwise grouped into a plurality of device data segments such as device triage data, device processing data, device characteristic data, component data, direct consumption data, and/or channel data. In some embodiments, one or more such data elements can be derived from another portion of data (e.g., characteristic data may be based on a device identifier).

In some examples, device data 402 (e.g., one or more segments of device data, such as device processing data) may include device allocation and registration, device shipping type, device manufacturing method, and/or the like. In some examples device characteristic data may include device type, device model, device location, device geographic region of service, and/or the like. In some examples, component data may include device battery type, device screen type, device processor type, and/or the like. In some examples, direct consumption data may include actual and/or predicted energy consumption of the device. In some examples channel data may include a pathway from which a mobile device may be received or into which a mobile device may be transmitted for disposition and/or various data associated therewith. In some embodiments, the device data (e.g., as a part of the device identifier or separately) may include data associated with the provider (e.g., carrier) and/or location of the device. The location data may be determined via a sensor (e.g., GPS receiver) associated with the mobile device, a cell tower location associated with the mobile device, and/or other stored data associated with the provider and/or mobile device. Other example device data are described in U.S. application Ser. No. 18/348,894 filed Jul. 7, 2023, and U.S. application Ser. No. 18/348,889 filed Jul. 7, 2023, and including U.S. Pat. No. 10,073,754, filed Sep. 13, 2013, which applications are each hereby incorporated by reference herein in their entireties.

It should be understood that the foregoing are provided as non-limiting examples, and some embodiments may include other device data and/or may not include some of the above device data. Moreover, the aforementioned device data may include additional data elements or may exclude one or more described data elements. Possible channels for mobile device reuse (e.g., 2nd and subsequent ownership/sale phases) may include, but are not limited to, resale (C2C, C2B2C, B2C, etc.); trade-in; repair/insurance; upgrade; etc. In some embodiments, refurbishment may be limited to cosmetic reconditioning, while in some embodiments, refurbishment/repair may include repairing and/or replacing various components of the devices. Devices may also be graded and/or otherwise diagnosed as part of this process. The result of the grading/diagnosis may be combined with the modeling to determine subsequent distribution channels and device handling. The aforementioned data may include or the resource usage prediction server may predict the resource usage associated with each of the foregoing, and the system may generate a total predicted resource usage for a predetermined time period (e.g., one or more usage phases, transition phases, disposal phases, etc.) by assembling the modeled resource usage associated with each portion of the device lifecycle selected for inclusion in the modeling process. Example modeling processes, including lifecycle and segment resource usage modeling, are described in U.S. application Ser. No. 18/348,894 filed Jul. 7, 2023, and U.S. application Ser. No. 18/348,889 filed Jul. 7, 2023 and other device modeling is described in U.S. Pat. No. 10,073,754, filed Sep. 13, 2013, which applications are each hereby incorporated by reference herein in their entireties.

In some embodiments, one or more models may be leveraged to determine predicted future resource usage based on at least a portion of the device data and/or disposition rule set associated with the mobile device. In some embodiments, future resource usage data may comprise data indicative of resource usage, resource requirements, and/or resource cost, including but not limited to resource requirements and/or resource cost associated with one or more device data segments, solutions, lifecycle stages, or the like associated with a mobile device for a predetermined future time period. The various data segments may be chosen and combined based on the aforementioned device data and/or disposition rule set. Resource usage, resource requirements, and/or resource cost may include direct and indirect requirements or costs, which requirements or costs may include net inputs and/or outputs associated with a device (e.g., energy fed into a device, whether directly or indirectly, for operation and/or emissions produced by a device, whether directly or indirectly). Non-limiting examples of future resource usage data include predicted energy requirements/cost for one or more device lifecycle stages, predicted greenhouse gas emissions (e.g., carbon footprint, such as carbon dioxide for one or more device life cycle stages), predicted material requirements/cost for one or more device life cycle stages, and/or the like.

As used herein, a device lifecycle stage may describe a particular stage of a series of stages associated with a device lifecycle (e.g., from sourcing to end of life of the device). Non-limiting examples of a device lifecycle stage include, but not limited to, any one or more of sourcing of raw material; manufacture of the mobile device (e.g., including one or more components thereof); transportation of the mobile device; one or more use phases of the mobile device; end of life of the mobile device; and/or one or more device triage periods of the device. As used herein, a use phase (also referred to as use period) may describe a time interval in which a mobile device is associated with a user. For example, a use phase may comprise a period in which a device is linked to a user account. In some example implementations, a mobile device may be associated with a plurality of sequential use phases (e.g., first use phase, second use phase, third use-phase and/or the like) with a given use phase separated in time from a subsequent use phase by a use phase transition period. For example, a first use phase may be separated in time from a second use phase by a first use phase transition period; the second use phase may be separated in time from a third use phase by a second use phase transition period, and so on. A use phase transition period (e.g., a triage period) may be associated with resource usage. For example, a use phase transition period may include a triage phase, repair phase, a refurbish phase, and/or other disposition that utilize resources. In some example implementations, the device management system may trigger a subsequent use phase (e.g., second use phase, third use phase, or the like) of a mobile device or a group of mobile devices by directing disposition of the mobile device or group of mobile devices based on the predicted resource usage data, wherein the subsequent use phase may comprise linking the mobile device or group of mobile devices with one or more subsequent user accounts. In some example implementations, the model(s) discussed herein may receive a utility measure (e.g., device grade) and/or other device triage data as an input which may inform if a mobile device is allocated to a subsequent use phase (e.g., versus immediately being sent to end-of-life processes) and/or the type of subsequent use phase (e.g., resale, insurance claim fulfillment, recycle, etc.).

Device lifecycle, device lifecycle stages, and associated processes including but not limited to predicting resource usage data associated with one or more device lifecycle stages are described in U.S. application Ser. No. 18/348,894 filed Jul. 7, 2023 and U.S. application Ser. No. 18/348,889 filed Jul. 7, 2023, and other device data examples are described in U.S. Pat. No. 10,073,754, filed Sep. 13, 2013, which applications are each hereby incorporated by reference herein in their entireties.

In some embodiments, generating the predicted future resource usage data includes determining a subsequent use-phase disposition (e.g., refurbish and resell, insurance claim fulfillment recycle, and/or the like) for the mobile device and predicting the resource usage associated therewith. In some embodiments, the subsequent use-phase disposition may be determined based on the disposition rule sets associated with the mobile device. For example, in such some embodiments, at least a portion of a disposition rule sets may include subsequent use phase disposition instruction sets (e.g., refurbish and resell, recycle, and/or the like) that defines a subsequent use phase for a mobile device based on a device make/model for the mobile device and/or other device data of the mobile device.

In some embodiments, the subsequent use-phase disposition may be determined based on the device triage data and/or device data (e.g., device make and model, and/or the like) associated with the mobile device. For example, the result of a device diagnosis analysis may inform the subsequent use-phase disposition for the mobile device. In some embodiments, one or more models may be configured to determine a subsequent use-phase for a mobile device based on device triage data for the mobile device and/or other device data for the mobile device and/or determine the resource usage associated with a preset or model-determined subsequent-use phase. The one or more models may describe parameters, hyper-parameters, and/or defined operations of a rules-based algorithm, machine learning model (e.g., model including at least one or more rule-based layers, one or more layers that depend on trained parameters, coefficients, and/or the like), and/or the like. In some embodiments, the one or more models may include a mobile device database comprising one or more lookup tables storing data and/or predictions that may leveraged to determine a subsequent use-phase disposition and/or resource usage data associated with a mobile device or group of mobile devices.

In some example implementations a user (e.g., mobile device user, non-mobile device user such as a service agent, and/or the like) may be presented (e.g., via a user interface) with one or more subsequent use-phase disposition options to enable the user to choose from the one or more subsequent use-phase disposition options. Based on one or more of the aforementioned determinations, including the predicted resource usage associated therewith, the resource usage prediction server may output the predicted future resource usage data 408. For example, the resource usage prediction server 108A may determine a utility measure (e.g., device grade) for a mobile device based on at least inspection data (e.g., cosmetic data), determine a subsequent use-phase disposition for the mobile device based on the utility measure, and output predicted resource usage data associated with the subsequent use-phase disposition. By way of non-limiting example, in response to determining that the device grade satisfies a predetermined utility measure threshold (e.g., device grade threshold) or otherwise is associated with a high utility measure/high grade, the resource usage prediction server 108A may direct the mobile device to a resale channel or other dispositions for a mobile device having a high utility measure/high grade. Directing the mobile device to a resale channel may include linking the mobile device with a subsequent user account. The resource usage prediction server 108A, using one or more models (e.g., including a mobile device resource usage prediction model), may then calculate predicted resource usage associated with the resale channel including, but not limited to, resource usage associated with shipping the mobile device, storing the mobile device (e.g., warehousing), and/or a second use phase for the mobile device with respect to a subsequent user account. As another non-limiting example, in response to determining that the utility measure (e.g., device grade) fails to satisfy the predetermined utility measure threshold (e.g., device grade threshold) or otherwise is associated with a low utility measure/low grade, the resource usage prediction server 108A may direct the mobile device to final disposition phase such as a recycle phase. The resource usage prediction server 108A, using one or more models, may then calculate predicted resource usage associated with the final disposition.

In certain embodiments, and as shown in FIG. 4, the one or more models includes a mobile device resource usage model 124 configured to generate predicted future resource usage data 408 associated with a mobile device for a predetermined future time period based on one or more of the device triage data 308A, the second device triage data 308B, and/or disposition rule set 404. In some examples, the mobile device resource usage model 124 may be configured to calculate or otherwise generate the predicted future resource usage data 408 from the time period starting at receipt of the resource usage mitigation indication and ending at a predicted recycling time. In some examples, the mobile device resource usage model 124 may be configured to calculate or otherwise generate the predicted future resource usage data 408 for only a subsequent (e.g., second, third, or the like) use phase associated with the mobile device. In some examples, the mobile device resource usage model 124 may be configured to calculate or otherwise generate the predicted future resource usage data 408 for both the second use phase associated with the mobile device and the transition phase between the first use phase and second use phase. In some examples, the mobile device resource usage model 124 may be configured to calculate or otherwise generate the predicted future resource usage data 408 for the full remaining lifespan of the mobile device, inclusive or exclusive of final disposition. In some examples, the mobile device resource usage model 124 may be configured to calculate or otherwise generate the predicted future resource usage data 408 starting at the time the mobile device is exchanged for a second mobile device or any other time period or life cycle stage(s).

In some embodiments, the mobile device resource usage model 124 may be configured to receive any type of device data, including the data described above, that may be leveraged by the mobile device resource usage model 124 to generate the predicted future resource usage data 408 associated with the mobile device. In some example implementations, the device data input to the mobile device resource usage model 124 includes device identifier, device make, device model, country of origin of the device, country of destination of the device, packaging, repair option, refurbishment option, recycling method, repurposing process used for the device, resource usage associated with manufacturing and transmitting the device, device manufacturer, resource usage data associated with the device model, resource usage data associated with the device lifecycle stages (which may include use phases and end of life), device weight, resource usage associated with the manufacture of the device, device shipping type, device manufacturing method, device type, device location, device geographic region of service, device battery type, device screen type, device processor type, energy consumption, device receiving pathway, and/or other device data associated mobile device. For example, in some embodiments, predicted future resource usage data may be determined based on device identifier data.

In some embodiments, the mobile device resource usage model 124 may be generated, configured, and/or trained using mobile device database. In various embodiments, the broad range of data of the mobile device database enables accurate modeling of resource usage and/or accurate training of the mobile device resource usage model 124, which in turn enables accurate future resource usage prediction. By way of non-limiting example, the training data for the mobile device resource usage model 124 may include one or more of a device identifier, device make, device model, device component type(s), country of origin of the device, country of destination of the device, disposition purpose, refurbishing, packaging, type of recycling or repurposing process used for the device and the emissions generated during the manufacturing and transportation, and/or the like. In some example embodiments, the mobile device resource usage model 124 may be configured to generate resource usage data predictions at a make and model level of granularity; a make, model, and location level of granularity; and/or an individual device level of granularity (with or without the device triage data). For each of the various modeling processes described herein, the model may be trained based on the mobile device database data associated with the prediction (e.g., shipping at a particular location may be predicted by modeling based on aggregated data associated with shipping to/from that location or between two specific locations). In some embodiments, the mobile device database may include a lookup table of such data and/or predictions. In some embodiments, the lookup table may be pre-generated using the foregoing modeling processes.

In some embodiments, generating the future resource usage data may include determining whether the screen of the mobile device needs to be replaced and including the resource usage associated with the replacement of the screen as part of the future resource usage (e.g., as part of a use phase transition phase determination). In some embodiments, the system 101 may be configured to determine future resource usage data for a mobile device based on resource usage data associated with individual components of the device in association with one or more of the aforementioned time periods. In some such embodiments, the system 101 may assemble resource usage data (e.g., total resource usage associated with a device over its lifetime or over a portion thereof) from a plurality of modeling processes based around subsets of the overall device, including but not limited to individual components and/or segments or portions thereof. For example, the system 101 may employ separate modeling processes for individual components, such as a model for the battery and a model for the screen using inputs identifying each separately, such that each unique device may be assessed as a sum of the models of one or more sub parts. In some embodiments, components making up less than a threshold amount of the total resource usage or total value of the device may or may not be modeled or may be modeled in aggregate. In an example, the system 101 may employ separate modeling processes for other discrete segments associated with a device, such as a particular lifecycle stage (e.g., a first use phase, a second use phase, a manufacturing period, one or more transportation periods, one or more device triage periods, a recycling and/or end-of-life period, or the like) or another incremental segment (e.g., transportation method, geographic region, etc.).

In some example implementations, the device management system 101 may be configured to predict future resource usage data for a device with respect to the lifecycle of the device or individual lifecycle stages of the device. In such example implementations, a mobile device may include one or more use phases, where each use phase may be associated with one or more device lifecycle stages. For example, the most basic lifecycle of a mobile device may be a single-use lifespan whereby a device is used for a first use phase (e.g., initial period, also referred to as a first use phase) by a first device owner after manufacturing of the device. After this first use phase, some users may discard or recycle their device and acquire (e.g., purchase, trade-in, etc.) a new device. In some instances, device trade-in, repair, refurbishment, and similar solutions may allow devices to be exchanged for new or used devices while the user's original device is repurposed for additional use phase (e.g., second use phase, third use phase, etc.). In such example implementations, the device management system 101, using a mobile device resource usage model may be configured to generate predicted future resource usage data that comprises one or more of (i) predicted subsequent use phase resource usage data associated with a first mobile device or (ii) predicted first use phase resource usage data associated with a second mobile device, where a disposition for the first mobile device comprise exchanging the first mobile device with the second mobile device. The second mobile device, for example, may be a new mobile, while the first mobile device may be a mobile device that is being through at least a first use phase. In some embodiments, the resource usage prediction server may predict resource usage for a new device (e.g., the device purchased by the user trading in a used mobile device) in addition to or instead of the predicted resource usage of the user's trade-in device. In modeling scenarios using a new device, the predicted resource usage associated with one or more use phases, including the first use phase, may be modeled in accordance with the various embodiments discussed herein. In some embodiments, the predicted resource usage associated with a first use phase, or any other phase of a new device may be generated without triaging the mobile device (e.g., using only device identifier data).

Example techniques for generating resource usage data for a device, such as a mobile device, are discussed in U.S. application Ser. No. 18/348,894 filed Jul. 7, 2023, and U.S. application Ser. No. 18/348,889 filed Jul. 7, 2023, which applications are each hereby incorporated by reference herein in their entireties.

Figure 5:
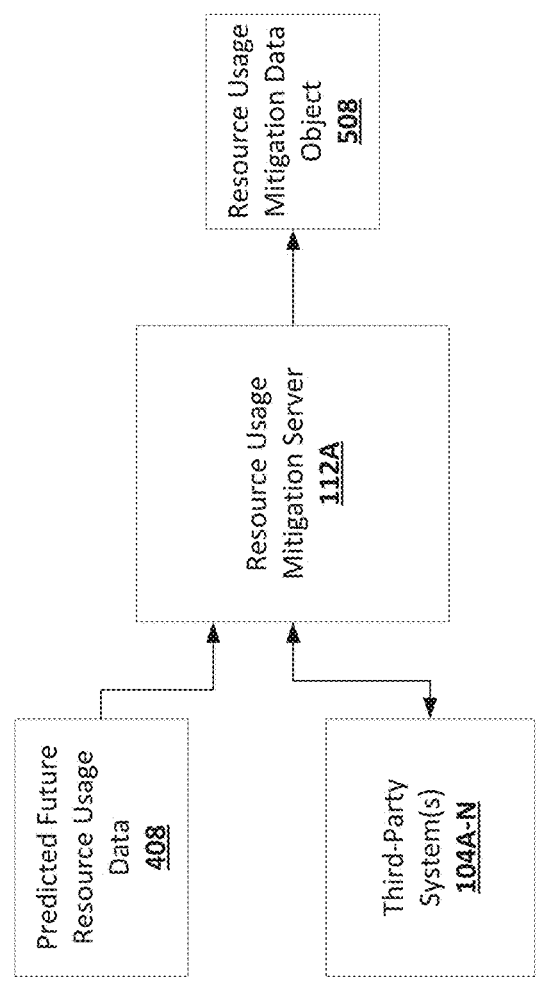
FIG. 5 illustrates an example data flow for generating resource usage mitigation data object in accordance with at least some embodiments of the present disclosure.

FIG. 5 is a block diagram showing an example data flow that may be used in connection with resource usage mitigation for a mobile device. Specifically FIG. 5 is a block diagram of an example data flow 500 for generating resource usage mitigation data object.

As shown in FIG. 5, a resource usage mitigation server 112A may be configured to receive predicted future resource usage data 408 for a mobile device or a group of mobile devices. The resource usage mitigation server 112A may be configured to perform one or more resource usage offset operations (e.g., resource usage offset calculation) based on the predicted future resource usage data 408 to generate a resource usage mitigation data object for the mobile device or group of mobile devices. In an example implementation, the predicted future resource usage data 408 may include predicted future resource usage data for a single mobile device for a predetermined future time period or any other example of predicted resource usage data described herein, including any portion thereof. In another example implementation, the predicted future resource usage data 408 may include first predicted future resource usage data for a first mobile device (e.g., a prior device being transmitted for a second use phase by a user) and second predicted future resource usage data for a second mobile device (e.g., a new device being reassigned to the user). By way of example, in such example implementation, the second mobile device may be configured to replace or otherwise exchanged for the first mobile device.

The resource usage mitigation data object may comprise resource usage equivalent corresponding to the predicted future resource usage data. For example, generating the resource usage mitigation data object 508 by performing the one or more resource usage offset operations may include converting or otherwise transforming the predicted future resource usage data 408 into a resource usage equivalent, which may be used to allocate a resource usage deficit to offset the predicted future resource usage. The resource usage equivalent may be determined with respect to the predicted future resource usage for a mobile device and/or a group of mobile devices. In one example implementation, the resource usage equivalent may be determined with respect to a single mobile device. For example, one or more resource usage offset operations may be performed with respect to a single mobile device to output a resource usage equivalent for the predicted resource usage data associated with the single mobile device. In another example implementation, the resource usage equivalent may be determined with respect to at least a first mobile device and a second mobile device associated with one user profile, where the second mobile device may, for example, be configured to replace the first mobile device for a particular user profile. For example, one or more resource usage offset operations may be performed with respect to a plurality of mobile devices associated with one user profile to output a resource usage equivalent for the predicted resource usage data associated with the plurality of mobile devices.

In some examples, the one or more resource usage offset operations may be determined with respect to a plurality of mobile devices associated with a plurality of user profiles. For example, one or more resource usage offset operations may be performed with respect to a plurality of mobile devices associated with a plurality of user profiles to output a resource usage equivalent for the predicted resource usage data associated with the plurality of mobile devices associated with a plurality of user profiles. In this regard, the resource usage equivalent may correspond to aggregated predicted future resource usage data for the plurality of mobile devices, wherein corresponding resource usage deficit to offset the predicted future resource usage may be acquired in bulk.

In some example implementations, predicted future resource usage data associated with a plurality of mobile devices over one or more previous time periods may be aggregated. Predicted resource usage data associated with a future time period may then be generated, based on the aggregated predicted future resource usage data, such as by using one or more machine learning models. The aggregated predicted future resource usage data may be adjusted for current resource usage rate conditions. The resource usage mitigation server 112A may cause resource usage deficit assignment from one or more third-party systems corresponding to the adjusted aggregated predicted resource usage associated with the future time period.

By way of non-limiting example, in some example implementations, the resource usage mitigation data object may comprise predicted token equivalent. In some embodiments, one or more resource offset models may be leveraged to perform the one or more resource usage offset operations or at least a portion of the one or more resource usage offset operations. For example, the one or more resource offset models may be leveraged to compute the corresponding resource usage equivalent for the predicted future resource usage data 408 based on data associated with one or more third-party systems.

In some embodiments, the resource usage equivalent may be determined based on data associated with one or more third-party systems. For example, generating the resource usage mitigation data object 508 may include communicating directly or indirectly with one or more third-party systems to identify and/or acquire resource usage deficit (e.g., via resource usage equivalent thereof) associated with a third-party system or subset of third-party systems based on associated data (e.g., resource usage deficit exchange rate, resource usage deficit type, etc.). At least a portion of the one or more third-party systems may be associated with resource usage deficit that may be used to offset the predicted future resource usage data 408.

Figure 6A:
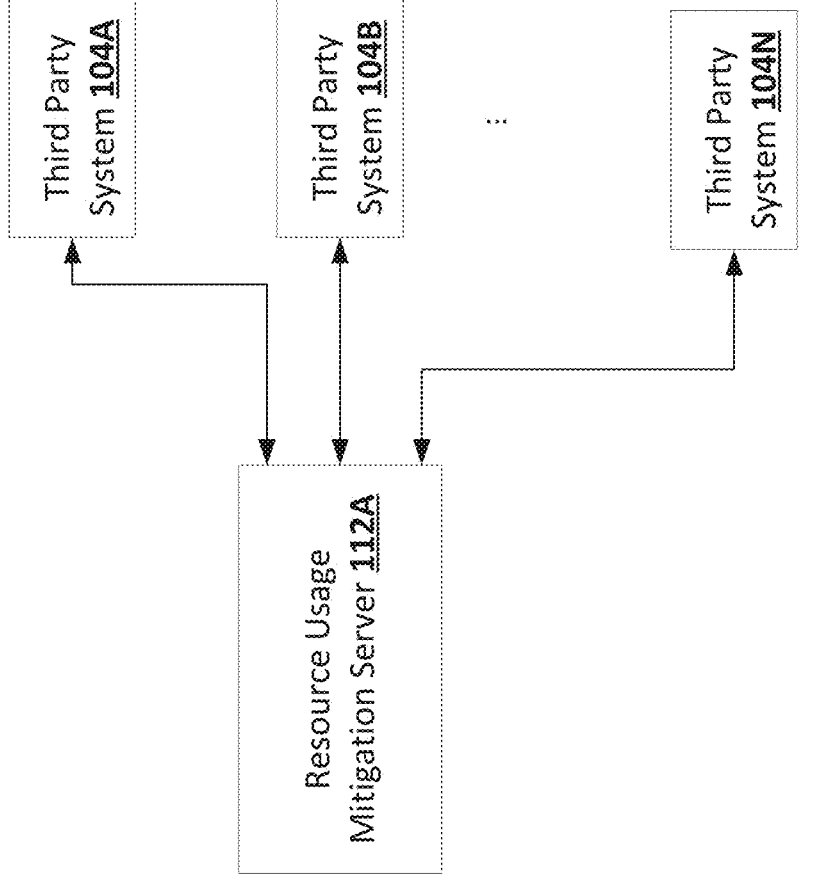
FIGS. 6A-6B illustrate example data flow for identifying resource usage deficit in accordance with at least some embodiments of the present disclosure.
Figure 6B:
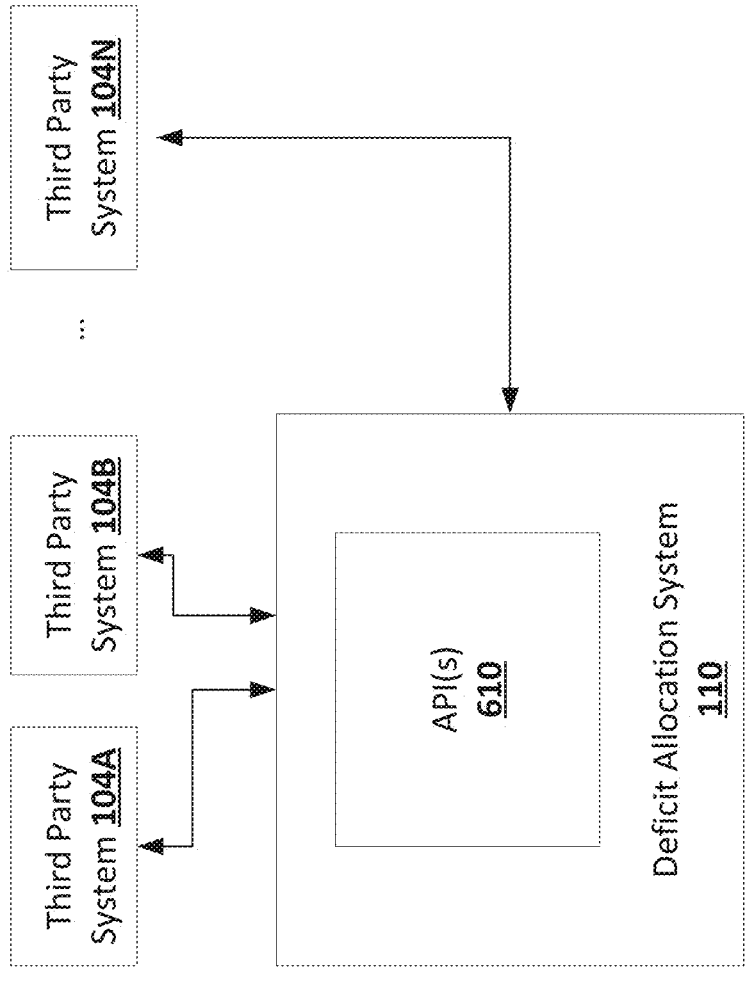

FIGS. 6A-B illustrates example data flows for identifying resource usage deficit in accordance with at least some embodiments of the present disclosure. As shown in FIG. 6A, in some example implementations, the resource usage mitigation server 112A may be configured to communicate directly with one or more third-party systems to select a third-party system or subset of third-party systems having a desired resource usage deficit. In some examples, the resource usage mitigation server 112A may utilize one or more APIs to communicated with the one or more third-party systems. As shown in FIG. 6B, in some example implementations, the resource usage mitigation server 112A may interact with a deficit allocation system 110 (e.g., an external system) to initiate, direct, or otherwise cause the deficit allocation system 110 to make one or more APIs calls to the one or more third-party systems to select a third-party system or subset of third-party systems having a desired resource usage deficit. As shown in FIG. 6B, the deficit allocation system 110 may include one or more APIs 610 configured to be used by the deficit allocation system 110 to communicate with one or more third-party systems 104A-N to source, manage, and/or direct the allocation of resource usage deficit associated with a third-party system, to offset predicted resource usage data associated with one or more mobile devices. In some embodiments, the deficit allocation system 110 may be an external computing system.

In some embodiments, the selected third-party system or subset of third-party systems may be selected based at least in part on one or more criteria (e.g., resource usage deficit exchange rate, resource usage deficit characteristic, and/or the like). In some example implementations, the selected third-party system or subset of third-party systems may be selected based at least in part on a disposition rule set associated with the mobile device or group of mobile devices. For example, the disposition rule sets may define a list of one or more third-party systems and/or resource usage deficit characteristics (e.g., resource usage deficit type such as source, location, deficit generation technology, etc.) that may be used to offset a given mobile device based on device make/model of the mobile device and/or other device data for the mobile device.

In such example implementations, one or more APIs may be configured to direct the resource usage mitigation server 112A directly or via the deficit allocation system 110 to a particular third-party system or subset of third-party systems based on at least a portion of the disposition rule set(s). By way of non-limiting example, in some example implementations, the disposition rule set(s) may indicate one or more resource usage deficit criteria for a particular mobile device make and/or model. In such example implementations, for a mobile device associated with a first device make and/or model, the resource usage mitigation server 112A directly or via the deficit allocation system may be directed to a first third-party system or a first subset of third-party systems, and for a mobile device associated with a second device make and/or model, the resource usage mitigation server 112A directly or via the deficit allocation system may be directed to a second third-party system or a second subset of third-party systems.

The resource usage mitigation server 112A may acquire resource usage deficit for offsetting the predicted resource usage data associated with a mobile device or group of mobile devices in real-time or near real-time. For example, the resource usage mitigation server 112A may communicate directly or indirectly (e.g., via deficit allocation system 110) in response to a signal, indication, request, and/or the like configured to trigger a resource usage mitigation process for a mobile device or group of mobile devices as described herein, such as a use-phase termination indication or other resource usage mitigation indication. A use phase termination indication may comprise instructions, signals, and/or data configured to indicate the end of a use phase associated with a mobile device.

In some examples, the resource usage mitigation server 112A may acquire resource usage deficit for offsetting the predicted resource usage data associated with a mobile device or group of mobile devices asynchronously with respect to the resource usage mitigation indication. For example resource usage deficit associated with a third-party system or subset of third-party systems may be acquired from the third-party system or subset of third-party systems for future allocation/assignment to one or more mobile devices (e.g., to offset predicted future resource usage data associated with the one or more mobile devices) prior to receiving use-phase termination indication(s) or other resource usage mitigation indication(s) for the one or more mobile devices. The resource usage mitigation server 112A may communicate directly or indirectly (e.g., via a deficit allocation system 110) with the one or more third-party systems to acquire resource usage deficits from the one or more third-party systems, and store the acquired resource usage deficit (e.g., a representation of the acquired resource usage deficit) in the resource usage mitigation database 112B for future allocation/assignment. The resource usage mitigation server 112A may be configured to retrieve, in real-time or near real-time, the resource usage deficit or corresponding resource usage equivalent from the resource usage mitigation database 112B in response to a use-phase termination indication or other resource usage mitigation indication configured to trigger a resource usage mitigation process for the mobile device.

In some embodiments, the resource usage mitigation server 112A may be configured to monitor a resource usage deficit inventory (e.g., unassigned resource usage deficit or corresponding resource usage equivalent) and communicate directly or indirectly with one or more third-party systems to acquire resource usage deficit based on the resource usage deficit inventory. In some example implementations, the resource usage mitigation server 112A may generate resource usage deficit forecasts and/or resource usage deficit acquisition schedules based on the resource usage deficit inventory. In such example implementations, the resource usage mitigation server 112A may communicate directly or indirectly with one or more third-party systems to acquire resource usage deficit based on the resource usage deficit inventory. In some embodiments, the resource usage mitigation server 112A may be configured to cause rendering of an interface element to a user associated with the mobile device. The interface element may comprise a visual representation of the resource usage mitigation data object. The resource usage mitigation server 112A may receive a selection indication associated with the interface element and transmit computer-executable instructions configured to cause resource usage mitigation for the mobile device based on the resource usage mitigation data object.

In some embodiments, the system 101 (e.g., one or more device management servers thereof) may be configured to generate aggregated predicted future resource usage data associated with a plurality of mobile devices over a previous time period. The system 101 may generate, using one or more machine learning models and based on the aggregated predicted future resource usage data, predicted resource usage associated with a future time period. The system 101 may transmit computer-executable instructions configured to cause resource usage deficit assignment from one or more third-party systems corresponding to the predicted resource usage associated with the future time period.

Example Methods

FIG. 7 illustrates an example flowchart depicting operations for mitigating resource usage in accordance with at least some example embodiments of the present disclosure. As depicted at block 702, the process 700 begins with receiving a resource usage mitigation indication associated with a mobile device. The resource usage indication may be transmitted at a predetermined time in the lifecycle of the mobile device or spontaneously.

For example, one or more device management servers associated with a device management system may receive a resource usage mitigation indication. The resource usage mitigation indication may be configured to trigger a resource usage mitigation process as described herein. In some embodiments, the resource usage mitigation indication may originate from the mobile device and/or transmitted from the mobile device to the one or more device management servers. In some embodiments, the resource usage mitigation indication may originate from and/or transmitted from another device or system separate from the mobile device.

In some example implementations, the resource usage mitigation indication may originate from one or more device management servers and/or transmitted from one or more device management servers associated with the device management system. By way of example, in some example implementations, the resource usage mitigation indication may originate from a device triage server associated with the device management system. In such example implementations, the device triage server may generate the resource usage mitigation indication based on result of a device diagnosis analysis performed with respect to the mobile device. In some embodiments, the resource usage mitigation indication may comprise a use phase termination indication associated with the mobile device.

At block 704, the process continues with receiving device data. In some example implementations, the one or more device management servers may receive device data associated with the mobile device from the mobile device and/or other device or system separate from the mobile device. The device data associated with mobile device may include at least device triage data for the mobile device. The device triage data may include diagnostic defect data, operational status data, device image data, and/or the like associated with the mobile device.

In some examples, the mobile device may be configured to execute one or more diagnostic functions on the mobile device to generate the device triage data based on the result of the one or more diagnostic functions. Additionally, the mobile device may be configured to transmit the device data, including the device triage data, directly or indirectly to the one or more device management servers. In some example implementations, device data associated with mobile device, including second device triage data for the mobile device, may be transmitted from one or more other devices, and/or systems separate from the mobile device. For example, a second device triage data for the mobile device may be generated by a second apparatus. The second apparatus may include an inspection machine configured to check the mobile device for damage/nonfunctional defects associated with the mobile device. By way of non-limiting example, the inspection machine may include one or more conveyors configured to receive and convey the mobile device for inspection; one or more robotic arms configured to hold the mobile device for inspection; an imaging system including one or more cameras for capturing images of the mobile device for inspection; and/or an electronic analysis system configured to electrically communicate (e.g., wirelessly or via USB) with the mobile device for electronically inspecting the mobile device (e.g., running diagnoses, collecting data from the device(s), wiping and/or modifying the memory of the mobile device, and/or the like). In some example implementations, the one or more device management servers may be configured to transmit computer-executable instructions to cause the second apparatus comprising at least one camera to capture one or more images of the mobile device, wherein the second device triage data comprises the captured images.

Additionally, in some embodiments, the device data for the mobile device includes a device identifier associated with the mobile device. In some example implementations, the one or more device management servers may be configured to transmit computer-executable instructions to cause the first mobile device to execute the one or more diagnostic functions on the mobile device to generate the device triage data.

In some example implementations, the one or more device management servers may receive second device data associated with a second mobile device. For example, in example implementations where a disposition for the mobile device includes exchanging the mobile device with a second mobile device, the one or more device management servers, may receive second device data associated with the second mobile device. The second device data associated with the second mobile device may include at least data about the second mobile device such as device identifier, device make, device model, predicted future resource usage data associated with the second mobile device for a predetermined future time period, and/or the like.

At block 706, the process continues with retrieving a disposition rule set associated with the mobile device. In some example implementations, the disposition rule set comprises subsequent use phase disposition rule set(s) for the mobile device. The disposition rule set may include an indication one or more resource usage deficit criteria for a particular mobile device make and/or model.

At block 708, the process continues with generating predicted future resource usage data associated with the mobile device and/or a second mobile device. In some example implementations, the predicted future resource usage data includes first predicted resource usage data associated with the mobile device and/or second predicted resource usage data associated with the second mobile device. In some example implementations, the first predicted resource usage data may include predicted subsequent use phase resource usage data associated with the mobile device, and the second predicted resource usage data may include predicted first use phase resource usage data associated with the second mobile device. The first predicted resource usage data may be generated using a mobile device resource usage model. For example, the one or more device management servers may generate the first predicted resource usage data based on one or more of the device triage data associated with the mobile device, the disposition rule sets associated with the mobile device, or second device triage data associated with the mobile device. In some example implementations, the disposition rule set may comprise subsequent use phase disposition rule set(s) for the mobile device. In such example implementations, generating the first predicted resource usage data associated the mobile device may comprise determining a use-phase indication associated with the mobile device based on the first device triage data and/or the subsequent use phase disposition rule set(s). In such example implementations, the use-phase indication may be configured to trigger a subsequent use phase (e.g., second use phase, third use phase, and/or the like) associated with the mobile device.

The second predicted resource usage data may be generated using the mobile device resource usage model and based on at least a portion of the device data associated with the second mobile device. In some embodiments, generating the future resource usage data includes processing the second device triage data (e.g., one or more captured images of the mobile device) to generate a utility measure (e.g., device grade) based at least in part on a condition of a screen of the mobile device; and responsive to triggering a replacement of the screen, generating predicted resource usage data associated with the replacement of the screen, wherein the predicted future resource usage data for the mobile device comprises a second predicted resource usage data associated with the replacement of the screen.

In some embodiments, the one or more device management servers may be configured to diagnose a defect associated with the mobile device based on the device triage data associated with the mobile device. The one or more device management servers may then programmatically determine a solution from a plurality of solutions for resolving the defect and generate, using the mobile device resource usage model, predicted resource usage data associated with the solution. The one or more device management servers may adjust the first predicted future resource usage data associated with the mobile device based on the predicted resource usage data associated with the solution.

At block 710, the process continues with generating resource usage mitigation data object for the mobile device based on the predicted future resource usage data. In some example embodiments, generating the resource usage mitigation data object comprises converting the predicted future resource usage into a resource usage equivalent. In such examples, the resource usage mitigation data object may include at least the resource usage equivalent corresponding to the predicted future resource usage. By way of example, in some example implementations, the resource usage equivalent comprises a predicted token equivalent. In such example implementations, generating the resource usage mitigation data object may comprise converting the predicted future resource usage into a predicted token equivalent, wherein the resource usage mitigation data object may include at least the predicted token equivalent. In some embodiments, generating the resource usage mitigation data object comprises comparing directly or indirectly via a third-party deficit allocation system, a plurality of third-party systems, and associating the resource usage deficit associated with a third-party system with the mobile device and/or second mobile device.

In some embodiments, the process/operation performed at block 710 may be performed in accordance with the example process/operation depicted in FIG. 8. The example process 800 beings at block 802, when the one or more device management servers identify resource usage deficit associated with a third-party system via one or more API calls.

At block 804, the process continues with executing one or more resource usage offset operations (e.g., calculating resource usage offset) based on the predicted future resource usage and resource usage deficit data associated with the third-party system. By way of non-limiting example, the resource usage deficit data may include a resource usage deficit type. In some example implementations, different third-party systems may have different resource usage characteristics such that a user may select between the different third-party systems. By way of example, in some example implementations, a resource usage deficit type may include processor architecture type, where a user may choose a desired and/or better suited processor architecture of a plurality of process architectures.

At block 806, the process continues with outputting, based on the one or more resource usage offset operations, resource usage mitigation data object comprising a resource usage equivalent. In some example implementations, the resource usage equivalent may comprise a predicted token equivalent.

Returning to FIG. 7, at block 712, the process continues with causing rendering of an interface element to a user associated with the mobile device. The interface element may comprise a visual representation of the resource usage mitigation data object. For example, the user (e.g., a user carrying out a trade-in) may be prompted to select from one or more options for resource usage mitigation (e.g., a particular time period to offset, a subset or portion of the predicted resource usage to offset, and/or a binary decision between resource usage mitigation and no resource usage mitigation). In some embodiments, the interface element may comprise a plurality of resource usage mitigation data objects (e.g., visual representations of an offer to acquire a resource usage equivalent based on the predicted future resource usage, which acquisition may be deducted from the value of the trade-in).

At block 714, the process continues with receiving a selection indication associated with the interface element. The selection indication may comprise instructions, signals and/or data configured to be used to determine whether and/or how much to perform resource usage mitigation for a mobile device or group of mobile devices as described herein (e.g., a selection of the options presented in the interface element at block 712). In some example implementations, the selection indication may originate from a user associated with the mobile device.

At block 716, the process continues with causing resource usage mitigation for the mobile device and/or second mobile device. The one or more device management servers may transmit computer-executable instructions configured to cause resource usage mitigation for the mobile device and/or second mobile device based on the resource usage mitigation data object. In some embodiments, transmitting the computer-executable instructions configured to cause the resource usage mitigation for the mobile device and/or the second mobile device comprises transmitting computer executable-instructions to offset the predicted future resource usage data (or at least a portion thereof) with resource usage deficit associated with a third-party system.

In some embodiments, transmitting the computer-executable instructions to offset the predicted future resource usage data with the resource usage deficit associated with the third-party system may comprise retrieving the resource usage equivalent, which may be a predicted token equivalent in some example implementations. For example, in example implementations, where generating the resource usage mitigation data object comprises converting the predicted future resource usage data into a predicted token equivalent, transmitting the computer-executable instructions to offset the predicted future resource usage data with the resource usage deficit associated with the third-party system may comprise retrieving the predicted token equivalent.

In some example implementations, transmitting computer-executable instructions configured to cause resource usage mitigation for the mobile device comprises exchanging the mobile device with a second mobile device by unlinking the mobile device from a user profile and linking the second mobile device to the user profile to mitigate resource usage associated with the mobile device and the second mobile device. For example, transmitting computer-executable instructions configured to cause resource usage mitigation for the mobile device comprises transmitting computer-executable instructions to cause the mobile device and the second mobile device to be associated with different user accounts.

In some embodiments, the resource usage mitigation data object may be used to offset the future predicted resource usage with a resource usage deficit of a third-party system, such that a net resource of a mobile device and/or second mobile device and the third-party is less than or equal to a maximum allowable resource usage threshold. In some embodiments, the future resource usage mitigation may be performed in response to and, in some instances, in real-time or near-real-time with the resource usage indication. In some example implementations, the predicted future resource usage and third-party resource usage may or may not be directly transferrable. In some embodiments, the resource usage mitigation data object may comprise a conversion of the predicted future resource usage and/or a resource usage deficit of the third-party system into a corresponding exchangeable representation of resource usage (e.g., resource usage equivalent) that may be leveraged to offset the predicted future resource usage data by exchanging the resource usage equivalent with a resource usage deficit associated with a third-party system.

Additionally, in some example implementations, causing resource usage mitigation for the mobile device and/or second mobile device may include applying the resource usage mitigation data object to the to a residual utility score associated with the mobile device. For example, in some example implementations where the mobile device is exchanged for a second mobile device, the one or more device management servers may generate a residual utility score for the mobile device based on the device triage data associated with the mobile device. For example, the one or more device management servers may process the device triage data associated with the mobile device to generate a residual utility score associated with the mobile device. In such example implementations, the one or more device management servers may apply the resource usage mitigation data object to the residual utility score by adjusting the residual utility score based on the resource usage mitigation data object.

In some embodiments, a utility measure (e.g., a device grade) may be assigned to a mobile device based on the device triage data, where the residual utility score for the mobile device may be determined based on the device grade. For example, the device triage data may include images of the mobile device screen, images of the back of the housing of the mobile device, images of the data ports, diagnostics data (e.g., battery life, processor performance, memory size), metadata about the mobile device, and/or the like. Device diagnosis analysis may be performed based on the device triage data to determine the device grade.

FIGS. 9A-B illustrate example graphical user interfaces depicting resource usage mitigation data object in accordance with at least some embodiments of the present disclosure. Specifically, FIG. 9A depicts an example graphical user interface 900A and FIG. 9B depicts an example graphical user interface 900B. As shown in FIG. 9A, the graphical user interface 900A may include a visual representation of a resource usage mitigation data object 901 and a selection indication 902, as described above. As shown in FIG. 9B, the graphical user interface 900B may include a plurality of resource usage offset options 904A-904N configured to enable a user to choose from the plurality of resource usage offset options 904A-904N as described above (e.g., selection indication). The graphical user interface 900B may also include a plurality of resource usage deficit selection options 906A-N configured to enable a user to select a desired resource usage deficit from the plurality of resource usage deficits. In some embodiments, the plurality of resource usage selection options 906A-N may be determined based on at least a portion of the disposition rule sets associated with the mobile device.

Various resource usage mitigation related processes, methodologies, systems, devices, and the like discussed herein may be used in connection with one or more workflows. For example, the various disclosures herein may be used in connection with enrollment in device protection, purchase of a new phone, purchase of a service contract, asynchronous user enrollment, or the like. By way of non-limiting example, in some example implementations, device triage data for a mobile device may be generated in response to an enrollment request. Predicted future resource usage data for the mobile device may then be generated based on the device triage data using the mobile device resource usage model. A resource usage mitigation data object may be generated for the mobile device based on the predicted future resource usage data, and computer-executable instructions configured to cause resource usage mitigation for the mobile device based on the resource usage mitigation data object may be transmitted. As another example, in response to a request for a new mobile device, the predicted future resource usage data for the mobile device may be determined based on the device data (e.g., device make and/or model). In such examples, device triage may not be performed.

As yet another example, the various disclosures herein may be used in combination with mobile device solutions, extended service contracts, vehicle protection services, renters' insurance, lender-placed insurance products and other specialty products. Similarly, the various disclosures herein may be used in combination with different market segments including mobile carriers, tech support, trade-in, device upgrade, asset disposition, and reverse logistics.

CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A system for carbon usage mitigation, the system comprising:

one or more device management servers and a first mobile device, the first mobile device comprising at least one processor and at least one non-transitory memory comprising computer program code, the at least one non-transitory memory and the computer program code configured to, with the at least one processor, cause the first mobile device to:

execute one or more diagnostic functions on the first mobile device to generate at least device triage data based on a result of the one or more diagnostic functions; and transmit the device triage data, directly or indirectly to the one or more device management servers;

the one or more device management servers comprising at least one processor and at least one non-transitory memory comprising computer program code, the at least one non-transitory memory and the computer program code configured to, with the at least one processor, cause the one or more device management servers to:

transmit computer-executable instructions to cause an apparatus comprising at least one camera to capture one or more images of the first mobile device, predict, by inputting the device triage data and image data corresponding to the one or more images of the first mobile device into a mobile device resource usage model, predicted future carbon usage data associated with the first mobile device for a future time period, wherein the mobile device resource usage model is configured to generate the predicted future carbon usage data based on the device triage data and the one or more images of the first mobile device;

generate, based on the predicted future carbon usage data, a resource usage mitigation data object for the first mobile device; and in response to a user selection via an interface, transmit computer-executable instructions configured to cause carbon usage mitigation for the first mobile device based on the resource usage mitigation data object.

2. The system of claim 1, wherein transmitting the computer-executable instructions configured to cause the carbon usage mitigation for the first mobile device based on the resource usage mitigation data object comprises transmitting computer-executable instructions configured to offset the predicted future carbon usage data with carbon usage deficit associated with a third-party system.

3. The system of claim 2, wherein generating the resource usage mitigation data object comprises converting the predicted future carbon usage data into a predicted token equivalent, and wherein transmitting the computer-executable instructions to offset the predicted future carbon usage data with the carbon usage deficit associated with the third-party system comprises retrieving the predicted token equivalent.

4. The system of claim 1, wherein the one or more device management servers is configured to transmit computer-executable instructions to cause the first mobile device to execute the one or more diagnostic functions on the first mobile device to generate the device triage data.

5. One or more device management servers for carbon usage mitigation, the one or more device management servers comprising at least one processor and at least one non-transitory memory comprising computer program code, the at least one non-transitory memory and the computer program code configured to, with the at least one processor, cause the one or more device management servers to:

receive device triage data associated with a first mobile device;

transmit computer-executable instructions to cause an apparatus comprising at least one camera to capture one or more images of the first mobile device, predict, by inputting the device triage data and image data corresponding to the one or more images of the first mobile device into a mobile device resource usage model, predicted future carbon usage data associated with the first mobile device for a future time period, wherein the mobile device resource usage model is configured to generate the predicted future carbon usage data based on the device triage data and the one or more images of the first mobile device;

generate, based on the predicted future carbon usage data, a resource usage mitigation data object for the first mobile device; and in response to a user selection via an interface, transmit computer-executable instructions configured to cause carbon usage mitigation for the first mobile device based on the resource usage mitigation data object.

6. The one or more device management servers of claim 5, wherein transmit the computer-executable instructions configured to cause the carbon usage mitigation for the first mobile device comprises transmitting computer-executable instructions to offset the predicted future carbon usage data with carbon usage deficit associated with a third-party system.

7. The one or more device management servers of claim 6, wherein generate the resource usage mitigation data object comprises converting the predicted future carbon usage data into a predicted token equivalent, and wherein transmit the computer-executable instructions to offset the predicted future carbon usage data with the carbon usage deficit associated with the third-party system comprises acquiring the predicted token equivalent.

8. The one or more device management servers of claim 5, wherein the at least one non-transitory memory and the computer program code are configured to, with the at least one processor, further cause the one or more device management servers to:

diagnose a defect associated with the first mobile device based on the device triage data;

programmatically determine a solution from a plurality of solutions for resolving the defect, determine, by the mobile device resource usage model, predicted carbon usage data associated with the solution, and adjust the predicted future carbon usage data based on the predicted carbon usage data associated with the solution.

9. The one or more device management servers of claim 5, wherein the device triage data comprises one or more of defect data, operational status data, or device image data.

10. The one or more device management servers of claim 5, wherein generate the predicted future carbon usage data comprises:

processing the one or more images to generate a utility measure for the first mobile device based at least in part on a condition of a screen of the first mobile device; and responsive to triggering a replacement of the screen, generating predicted carbon usage data associated with the replacement of the screen, wherein the predicted future carbon usage data for the first mobile device comprises the predicted carbon usage data associated with the replacement of the screen.

11. The one or more device management servers of claim 5, wherein transmit the computer-executable instructions configured to cause carbon usage mitigation for the first mobile device comprises transmitting computer-executable instructions to cause the first mobile device and a second mobile device to be associated with different user accounts.

12. The one or more device management servers of claim 5, wherein the at least one non-transitory memory and the computer program code are configured to, with the at least one processor, further cause the one or more device management servers to:

generate aggregated predicted future carbon usage data associated with a plurality of mobile devices over a previous time period;

generate, using one or more machine learning models and based on the aggregated predicted future carbon usage data, predicted carbon usage associated with the future time period; and transmit computer-executable instructions configured to cause carbon usage deficit assignment from one or more third-party systems corresponding to the predicted carbon usage associated with the future time period.

13. A computer implemented method for carbon usage mitigation, the computer implemented method comprising:

receiving, by one or more processors, device triage data associated with a first mobile device;

transmitting, by the one or more processors, computer-executable instructions to cause an apparatus comprising at least one camera to capture one or more images of the first mobile device, predicting, by the one or more processors, by inputting the device triage data and image data corresponding to the one or more images of the first mobile device into a mobile device resource usage model, predicted future carbon usage data associated with the first mobile device for a future time period, wherein the mobile device resource usage model is configured to generate the predicted future carbon usage data based on the device triage data and the one or more images of the first mobile device;

generating, by the one or more processors, based on the predicted future carbon usage data, a resource usage mitigation data object for the first mobile device; and in response to a user selection via an interface, transmitting, by the one or more processors, computer-executable instructions configured to cause carbon usage mitigation for the first mobile device based on the resource usage mitigation data object.

14. The computer implemented method of claim 13, wherein transmitting the computer-executable instructions configured to cause the carbon usage mitigation for the first mobile device comprises transmitting computer-executable instructions to offset the predicted future carbon usage data with carbon usage deficit associated with a third-party system.

15. The computer implemented method of claim 14, wherein generating the resource usage mitigation data object comprises converting the predicted future carbon usage data into a predicted token equivalent, and wherein transmitting the computer-executable instructions to offset the predicted future carbon usage data with the carbon usage deficit associated with the third-party system comprises acquiring the predicted token equivalent.

16. The computer implemented method of claim 13, further comprising:

diagnosing a defect associated with the first mobile device based on the device triage data;

programmatically determining a solution from a plurality of solutions for resolving the defect, determining, by the mobile device resource usage model, predicted carbon usage data associated with the solution, and adjusting the predicted future carbon usage data based on the predicted carbon usage data associated with the solution.

17. The computer implemented method of claim 13, wherein the device triage data comprises one or more of defect data, operational status data, or device image data.

18. The computer implemented method of claim 13, wherein generating the predicted future carbon usage data comprises:

processing the one or more images to generate a utility measure for the first mobile device based at least in part on a condition of a screen of the first mobile device; and responsive to triggering a replacement of the screen, generating predicted carbon usage data associated with the replacement of the screen, wherein the predicted future carbon usage data for the first mobile device comprises the predicted carbon usage data associated with the replacement of the screen.

* * * * *